United States Patent
Li et al.

(10) Patent No.: US 11,006,134 B2
(45) Date of Patent: May 11, 2021

(54) PICTURE DECODING AND ENCODING METHODS AND APPARATUSES, DECODER, AND ENCODER

(71) Applicant: ZTE CORPORATION, Guangdong (CN)

(72) Inventors: Ming Li, Shenzhen (CN); Ping Wu, Shenzhen (CN); Zhao Wu, Shenzhen (CN); Guoqiang Shang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 404 days.

(21) Appl. No.: 16/067,420

(22) PCT Filed: Nov. 15, 2016

(86) PCT No.: PCT/CN2016/105926
§ 371 (c)(1),
(2) Date: Jun. 29, 2018

(87) PCT Pub. No.: WO2017/114016
PCT Pub. Date: Jun. 7, 2017

(65) Prior Publication Data
US 2019/0014331 A1    Jan. 10, 2019

(30) Foreign Application Priority Data
Dec. 31, 2015 (CN) .......................... 201511032566.3

(51) Int. Cl.
*H04N 19/196* (2014.01)
*H04N 19/30* (2014.01)
(Continued)

(52) U.S. Cl.
CPC ......... *H04N 19/196* (2014.11); *H04N 19/117* (2014.11); *H04N 19/154* (2014.11);
(Continued)

(58) Field of Classification Search
None
See application file for complete search history.

(56) References Cited

U.S. PATENT DOCUMENTS

| 2015/0003749 A1 | 1/2015 | Kim et al. |
| 2015/0195574 A1 | 7/2015 | Yu et al. |

(Continued)

FOREIGN PATENT DOCUMENTS

| CN | 101841708 A | 9/2010 |
| CN | 104754347 A | 7/2015 |

(Continued)

OTHER PUBLICATIONS

International Search Report and Written Opinion for PCT Appl. No. PCT/CN2016/105926, dated Feb. 21, 2017.
(Continued)

*Primary Examiner* — Stuart D Bennett
(74) *Attorney, Agent, or Firm* — Foley & Lardner LLP

(57) ABSTRACT

The present disclosure provides picture encoding and decoding methods, picture encoding and decoding devices as well as a decoder and an encoder. The picture decoding method includes: parsing a video bitstream to obtain candidate reshaping parameters from a picture-layer and/or slice-layer data unit of the video bitstream, and determining a reshaping parameter used for reshaping a reconstructed picture according to the obtained candidate reshaping parameters; and reshaping the reconstructed picture by using the reshaping parameter. The reconstructed picture is a picture obtained by decoding the video bitstream before performing the reshaping. The picture-layer and/or slice-layer data unit includes at least one of the following data units: a picture-layer parameter set and/or a slice-layer parameter set different from a picture parameter set (PPS), a parameter data unit which are included in an access unit (AU) corresponding to the recon-
(Continued)

structed picture, slice header and a system-layer picture parameter data unit.

16 Claims, 3 Drawing Sheets

(51) Int. Cl.
*H04N 19/70* (2014.01)
*H04N 19/117* (2014.01)
*H04N 19/154* (2014.01)
*H04N 19/174* (2014.01)

(52) U.S. Cl.
CPC ........... *H04N 19/174* (2014.11); *H04N 19/30* (2014.11); *H04N 19/70* (2014.11)

(56) References Cited

U.S. PATENT DOCUMENTS

| | | | |
|---|---|---|---|
| 2018/0167637 A1* | 6/2018 | Yin | H04N 19/85 |
| 2018/0242006 A1* | 8/2018 | Kerofsky | H04N 19/186 |

FOREIGN PATENT DOCUMENTS

| | | |
|---|---|---|
| EP | 3 024 222 A1 | 5/2016 |
| WO | WO 2014/204865 A1 | 12/2014 |
| WO | WO-2015/008987 A1 | 1/2015 |
| WO | WO 2015/057701 A1 | 4/2015 |
| WO | WO-2015/057704 A1 | 4/2015 |
| WO | WO-2017/011636 A1 | 1/2017 |

OTHER PUBLICATIONS

Koohyar Minoo et al., "Exploratory Test Model for HDR extension of HEVC", 113. MPEG Meeting, Oct. 10-23, 2015, Geneva, (Motion Picture Expert Group or ISO/IEC JTC1/SC29/WG11), No. NI5792, Oct. 23, 2015 (Oct. 23, 2015), XP030022475.
Wenger S et al, "Adaptation Parameter Set (APS)", 6. JCT-VC Meeting; 97. MPEG Meeting; Jul. 14-22, 2011, Torino, IT, (Joint Collaborative Team on Video Coding of ISO/IEC JTC1/SC29/WG11 and ITU-T SG.16 ); URL: http://wftp3.itu.int/av-arch/jctvc-site/,, No. JCTVC-F747, Jul. 17, 2011 (Jul. 17, 2011), XP030009770.
D. Bugdayei Sansli et al., "Dynamic Range Adjustment SEI Message"; Joint Collaborative Team on Video Coding of ITU-T SG16 WP3 and ISO/IEC JTC1/SC29/WG11 21st meeting; Jun. 19-26, 2015; pp. 1-8; JCTVC-U0098; Warsaw, PL.
Extended European Search Report for EP Appl. No. 16880806.1, dated Jul. 11, 2019.
First Office Action for JP Appl. No. 2018-534535, dated Jun. 26, 2019.
Koohyar Minoo et al., "NI5792, Exploratory Test Model for HDR extension of HEVC", 113, MPEG meeting; Oct. 19-23, 2015; Geneva; Oct. 23, 2015 (Oct. 23, 2015), pp. 1-14, XP055608599 (Motion Picture Expert Group or ISO/IEC JTC1/SC29/WG11), Retrieved from the Internet: URL: https://mpeg.chiariglione.org/standards/mpeg-h/high-efficiency-video-coding/n15792-exploratory-test-model-hdr-extension-hevc [retrieved on Jul. 24, 2019].

* cited by examiner

PICTURE DECODING AND ENCODING METHODS AND APPARATUSES, DECODER, AND ENCODER

CROSS REFERENCE TO RELATED APPLICATIONS

This application is a U.S. National Stage under 35 U.S.C. § 371 of International Application No. PCT/CN2016/105926, filed on Nov. 15, 2016, which claims priority to Chinese Patent Application No. 201511032566.3, filed on Dec. 31, 2015, the contents of which are incorporated herein by reference in their entirety for all purposes

TECHNICAL FIELD

The present invention relates to the field of communications, and in particular, to picture decoding and encoding methods and picture decoding and encoding apparatuses, a decoder, and an encoder.

BACKGROUND

Currently, the International Standards Organization is developing an extension standard for a high dynamic range (HDR) video on the H.265/HEVC standard. The extension standard for the HDR proposes to use a signal processing framework of a "reshaper" to build a test model. At a source end, the reshaper processes an input HDR video into an input video (such as a standard dynamic range (SDR) video) suitable for a H.265/HEVC Main 10 Profile encoder. At a receiving end, the reshaper processes a reconstructed SDR video decoded by the H.265/HEVC Main 10 Profile decoder into the HDR video by using an operation inverse to the operation of the source end. Meanwhile, if the HDR video and the SDR video use different color gamuts (the HDR video uses a larger color gamut), then a conversion on the color gamut of the video will also be involved in the operations of the reshaper at the source end and the receiving end.

To support the above signal processing framework, the International Standards Organization has extended the H.265/HEVC to encode and transmit information used to guide the operation of the reshaper at the receiving end in a parameter set structure. Alternatively, parameters of conversion characteristics of the HDR video are encoded and transmitted in an extension of a sequence parameter set (SPS), and parameters used for reshaping the operation of the reshaper at the receiving end are encoded and transmitted in an extension of a picture parameter set (PPS). At the receiving end, after the decoder reconstructs a picture, a reshaping operation is performed on the reconstructed picture according to the parameters in the parameter set, so that the reconstructed picture is converted into the HDR picture.

In the above method, in a slice decoding process, the parameter set which is referred to by a slice directly or indirectly by a parameter set identifier is activated, and a slice is decoded by using an information parameter in the parameter set. An activated SPS is in effect for the entire coded video sequence (CVS), that is, the same SPS is used in the slice decoding processes in the same CVS. An activated PPS is in effect for a picture, that is, the same PPS is used for decoding slices in a picture. Corresponding to an encoding process, the slice in the same CVS need to refer to the same SPS, and the information parameter in the SPS is constant in the encoding process of the CVS; the slices in the same picture need to refer to the same PPS, and parameter information in the PPS is constant in the picture encoding process.

Conversion processes of the dynamic range and the color gamut will bring irreversible information loss. Actual measurement shows that compared with an original HDR video, there may be visible distortions such as loss of texture details, color distortion, and the like, in the HDR video reconstructed by the receiving end by using the reshaper with the aforementioned signal processing framework, and these visible distortions are related to a compression rate of the video by using the H.265/HEVC encoder. In general, the higher the compression ratio is (i.e., the lower the encoding rate is), the greater the distortion due to lossy compression in a decoded video is, and the HDR video outputted by the reshaper after the decoded video is processed includes more texture and color distortions. Accordingly, according to factors such as source characteristics of the HDR video and lossy compression characteristics of the encoder, dynamically adjusting the parameter of the reshaper in the encoding process of the HDR video may effectively improve the subjective viewing quality of the reconstructed HDR video at the receiving end.

The PPS theoretically provides a mechanism for adaptive adjustment of the encoding parameter in a picture layer, and the picture adaptive adjustment of the reshaper may be implemented by setting the PPS separately for each picture. However, the parameter of the reshaper is encoded in the extension of the PPS, so when the parameter of the reshaper is adjusted for each picture, it is necessary to repeatedly encode other encoding parameters in the PPS that do not need to be adjusted. These repeated encoding parameters will bring about relatively high bit encoding overhead.

In view of poor viewing quality of the video and high encoding overhead of the reshaping parameter in the related art, no effective solution has been proposed yet.

SUMMARY

Embodiments of the present disclosure provide picture decoding and encoding methods, picture decoding and encoding devices, as well as a decoder and an encoder to at least solve problems of poor viewing quality of a video and high encoding overhead of a reshaping parameter in the related art.

According to an aspect of the embodiments of the present disclosure, there is provided a picture decoding method, including: parsing a video bitstream to obtain a reshaping parameter from a picture-layer data unit and/or a slice-layer data unit of the video bitstream, and determining a reshaping parameter used for reshaping a reconstructed picture according to the obtained reshaping parameter; and reshaping the reconstructed picture by using the reshaping parameter used for reshaping the reconstructed picture. The reconstructed picture is a picture obtained by decoding the video bitstream before the reshaping is performed. The picture-level data unit and/or the slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

In an alternative embodiment, before obtaining a reshaping parameter from a picture-layer data unit and/or a slice-layer data unit of the video bitstream, and determining a reshaping parameter used for reshaping a reconstructed picture according to the obtained reshaping parameter, the method further includes: determining a PPS identifier in the slice header included in the AU of the video bitstream; and obtaining the reshaping parameter used for reshaping the reconstructed picture according to the PPS referred to by using the PPS identifier.

In an alternative embodiment, the obtaining the reshaping parameter used for reshaping the reconstructed picture according to the PPS referred to by using the PPS identifier includes: determining whether an extended part of the PPS and/or a parameter set referred to by the PPS carries a first reshaping parameter; when it is determined that the extended part of the PPS and/or the parameter set referred to by the PPS carries the first reshaping parameter, determining that the obtained reshaping parameter used for reshaping the reconstructed picture is the first reshaping parameter; and/or, when it is determined that the extended part of the PPS and/or the parameter set referred to by the PPS does not carry the first reshaping parameter, determining that the obtained reshaping parameter used for reshaping the reconstructed picture is a preset value or is null.

In an alternative embodiment, the obtaining a reshaping parameter from a picture-layer data unit and/or a slice-layer data unit of the video bitstream and determining a reshaping parameter used for reshaping a reconstructed picture according to the obtained reshaping parameter includes: parsing an extended portion of the slice header to obtain a second reshaping parameter; updating or re-determining the reshaping parameter used for reshaping the reconstructed picture by using the second reshaping parameter.

In an alternative embodiment, the obtaining a reshaping parameter from a picture-layer data unit and/or a slice-layer data unit of the video bitstream and determining a reshaping parameter used for reshaping a reconstructed picture according to the obtained reshaping parameter includes: parsing a parameter data unit included in the AU of the video bitstream to obtain a third reshaping parameter, where the parameter data unit is a data unit included in the AU and independent from a slice bitstream data unit; and updating or re-determining the reshaping parameter used for reshaping the reconstructed picture by using the third reshaping parameter; or determining that the reshaping parameter used for reshaping the reconstructed picture is the third reshaping parameter according to a pre-configured reshaping parameter determination manner.

In an alternative embodiment, the updating or re-determining the reshaping parameter used for reshaping the reconstructed picture by using the third reshaping parameter includes: determining a PPS identifier in the slice header included in the AU of the video bitstream; obtaining the reshaping parameter used for reshaping the reconstructed picture according to a PPS referred to by using the PPS identifier; and updating or re-determining the obtained reshaping parameter used for reshaping the reconstructed picture by using the third reshaping parameter.

In an alternative embodiment, the obtaining the reshaping parameter used for reshaping the reconstructed picture according to the PPS referred to by using the PPS identifier includes: determining whether an extended part of the PPS and/or a parameter set referred to by the PPS carries a first reshaping parameter; when it is determined that the extended part of the PPS and/or the parameter set referred to by the PPS carries the first reshaping parameter, determining that the obtained reshaping parameter used for reshaping the reconstructed picture is the first reshaping parameter; and/or, when it is determined that the extended part of the PPS and/or the parameter set referred to by the PPS does not carry the first reshaping parameter, determining that the obtained reshaping parameter used for reshaping the reconstructed picture is a preset value or is null.

In an alternative embodiment, the third reshaping parameter comprises a fourth reshaping parameter obtained by parsing a parameter data unit included in a preceding AU of the AU.

In an alternative embodiment, the pre-configured reshaping parameter determination manner includes at least one of the following: a default determination manner, a determination manner of using first identification information obtained by parsing a video parameter set (VPS) to indicate the reshaping parameter, and a determination manner of using second identification information obtained by parsing a sequence parameter set (SPS) to indicate the reshaping parameter.

In an alternative embodiment, the obtaining a reshaping parameter from a picture-layer data unit and/or a slice-layer data unit of the video bitstream and determining a reshaping parameter used for reshaping a reconstructed picture according to the obtained reshaping parameter includes: parsing the slice header included in the AU to obtain third identification information, where the third identification information is used for indicating whether the reshaping parameter used for reshaping the reconstructed picture is determined according to a picture-layer parameter set and/or a slice-layer parameter set other than the PPS; when the third identification information indicates that the reshaping parameter used for reshaping the reconstructed picture is determined according to a picture-layer parameter set and/or a slice-layer parameter set other than the PPS, parsing the slice header included in the AU to obtain an identifier of the picture-layer parameter set and/or the slice-layer parameter set other than the PPS, activating a parameter set whose identifier is the same as the identifier of the picture-layer parameter set and/or the slice-layer parameter set other than the PPS to obtain a fifth reshaping parameter; and updating or re-determining the obtained reshaping parameter used for reshaping the reconstructed picture by using the fifth reshaping parameter.

In an alternative embodiment, the parsing a video bitstream to obtain a reshaping parameter from a picture-layer data unit and/or a slice-layer data unit of the video bitstream and determining a reshaping parameter used for reshaping a reconstructed picture according to the obtained reshaping parameter includes: obtaining a sixth reshaping parameter from a system-layer picture parameter data unit in a transport stream or a media file for carrying the video bitstream; and updating or re-determining the reshaping parameter used for reshaping the reconstructed picture by using the sixth reshaping parameter; or determining that the reshaping parameter used for reshaping the reconstructed picture is the sixth reshaping parameter. The system-layer picture parameter data unit comprises description information or auxiliary information corresponding to the AU of the video bitstream.

In an alternative embodiment, the updating or re-determining the reshaping parameter used for reshaping the reconstructed picture by using the sixth reshaping parameter includes: determining a PPS identifier in the slice header included in the AU of the video bitstream; obtaining the reshaping parameter used for reshaping the reconstructed picture according to the PPS referred to by using the PPS identifier; and updating or re-determining the reshaping parameter used for reshaping the reconstructed picture by using the sixth reshaping parameter.

In an alternative embodiment, the obtaining the reshaping parameter used for reshaping the reconstructed picture according to the PPS referred to by using the PPS identifier includes: determining whether an extended part of the PPS and/or a parameter set referred to by the PPS carries a first reshaping parameter; when it is determined that the extended part of the PPS and/or the parameter set referred to by the PPS carries the first reshaping parameter, determining that the obtained reshaping parameter used for reshaping the reconstructed picture is the first reshaping parameter; and/or, when it is determined that the extended part of the PPS and/or the parameter set referred to by the PPS does not carry the first reshaping parameter, determining that the obtained reshaping parameter used for reshaping the reconstructed picture is a preset value or is null.

In an alternative embodiment, the obtaining a sixth reshaping parameter from a system-layer picture parameter data unit in a transport stream or a media file for carrying the video bitstream includes: determining the reshaping parameter according to at least one of the following parameters obtained from the system-layer picture parameter data unit: an identification parameter indicating whether to perform a reshaping operation, a dynamic range reshaping parameter, a color gamut reshaping parameter, and a use range of the reshaping parameter.

In an alternative embodiment, the method further includes: obtaining a reshaping parameter for performing a secondary reshaping on the reconstructed picture from a system-layer picture parameter data unit in a transport stream or a media file for carrying the video bitstream, where the system-layer picture parameter data unit comprises description information or auxiliary information corresponding to the AU of the video bitstream; and performing the secondary reshaping on the reconstructed picture by using the obtained reshaping parameter for performing the secondary reshaping on the reconstructed picture.

In an alternative embodiment, the obtaining a reshaping parameter for performing a secondary reshaping on the reconstructed picture from a system-layer picture parameter data unit in a transport stream or a media file for carrying the video bitstream includes: determining the reshaping parameter for performing the secondary reshaping on the reconstructed picture according to at least one of the following parameters obtained from the system-layer picture parameter data unit: an identification parameter indicating whether to perform reshaping, a dynamic range reshaping parameter, a color gamut reshaping parameter, and a use range of the reshaping parameter.

According to another aspect of the embodiments of the present disclosure, there is provided a picture encoding method, including: determining a reshaping parameter used for reshaping a reconstructed picture for converting the reconstructed picture into a high dynamic range (HDR) video picture, where the reconstructed picture is a standard dynamic range (SDR) picture obtained by locally reconstructing a current coding picture by an encoder before the encoder performs reshaping, or the reconstructed picture is an SDR picture obtained by decoding a to-be-processed video bitstream; and writing the determined reshaping parameter used for reshaping the reconstructed picture into a picture-level data unit and/or a slice-layer data unit of a video bitstream in which the bits of the current coding picture are included or into the picture-layer data unit and/or the slice-layer data unit of the to-be-processed video bitstream. The picture-level data unit and/or the slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

In an alternative embodiment, the determining a reshaping parameter used for reshaping a reconstructed picture for converting the reconstructed picture into an HDR video picture includes: determining a picture-layer reshaping parameter and a sequence-layer reshaping parameter, and determining the reshaping parameter used for reshaping the reconstructed picture according to the picture-layer reshaping parameter and the sequence-layer reshaping parameter. The picture-layer reshaping parameter includes a filter coefficient used in a reshaping process of minimizing an error between the reconstructed picture and the target HDR picture. The sequence-layer reshaping parameter includes a dynamic range and a color gamut of a target HDR video constituted by the target HDR picture, a dynamic range and a color gamut of a reconstructed video constituted by the reconstructed picture, a determined mapping parameter from the dynamic range of the reconstructed video to the dynamic range of the target HDR video, and/or a conversion parameter from the color gamut of the reconstructed video to the color gamut of the target HDR video.

In an alternative embodiment, the target HDR picture is an HDR picture that is in an original HDR video inputted into an encoder and corresponds to the reconstructed picture.

In an alternative embodiment, the determining the reshaping parameter used for reshaping the reconstructed picture according to the picture-layer reshaping parameter and the sequence-layer reshaping parameter includes: reshaping the reconstructed picture by using the picture-layer reshaping parameter and reshaping the reconstructed picture by using the sequence-layer reshaping parameter; and determining that one of the picture-layer reshaping parameter and the sequence-layer reshaping parameter which minimizes the error between the HDR picture obtained by reshaping the reconstructed picture and the target HDR picture is the reshaping parameter used for reshaping the reconstructed picture.

In an alternative embodiment, the writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream includes: when the reshaping parameter used for reshaping the reconstructed picture is the sequence-layer reshaping parameter, encoding the sequence-layer reshaping parameter, and writing encoded bits into the picture parameter set (PPS) and/or the parameter set referred to by the PPS of the video bitstream in which the bits of the current coding picture are included or into the picture-layer data unit and/or the slice-layer data unit of the to-be-processed video bitstream; when the reshaping parameter used for reshaping the reconstructed picture is the picture-layer reshaping parameter, encoding the picture-layer reshaping parameter, and writing encoded bits into the slice header included in the AU of the video bitstream in which the bits of the current coding picture are included or into the picture-layer data unit and/or the slice-layer data unit of the to-be-processed video bitstream.

In an alternative embodiment, the determining a reshaping parameter used for reshaping the reconstructed picture according to the picture-layer reshaping parameter and the sequence-layer reshaping parameter includes: determining that one of the picture-layer reshaping parameter, the sequence-layer reshaping parameter, and a reshaping parameter used for reshaping a preceding encoded picture in an encoding order is the reshaping parameter used for reshaping reconstructed picture.

In an alternative embodiment, the determining that one of the picture-layer reshaping parameter, the sequence-layer reshaping parameter, and a reshaping parameter used for reshaping a preceding encoded picture according to an encoding order is the reshaping parameter used for reshaping the reconstructed picture includes: reshaping the reconstructed picture by using the picture-layer reshaping parameter, reshaping the reconstructed picture by using the sequence-layer reshaping parameter, and reshaping the reconstructed picture by using the reshaping parameter used for reshaping the preceding encoded picture; and determining that one of the picture-layer reshaping parameter, the sequence-layer reshaping parameter and the reshaping parameter used for reshaping the preceding encoded picture which minimizes the error between the HDR picture obtained by reshaping the reconstructed picture and the target HDR picture is the reshaping parameter used for reshaping the reconstructed picture.

In an alternative embodiment, the writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream includes: when the reshaping parameter used for reshaping the reconstructed picture is the sequence-layer reshaping parameter, encoding the sequence-layer reshaping parameter, and writing encoded bits into the PPS and/or the parameter set referred to by the PPS of the video bitstream in which the bits of the current coding picture are included or into the picture-layer data unit and/or the slice-layer data unit of the to-be-processed video bitstream; when the reshaping parameter used for reshaping the reconstructed picture is the picture-layer reshaping parameter or the reshaping-parameter used for reshaping the preceding encoded picture, encoding the picture-layer reshaping parameter or the reshaping parameter used for reshaping the preceding encoded picture, and writing encoded bits into the parameter data unit included in the AU of the video bitstream in which the bits of the current coding picture are included or into the picture-layer data unit and/or the slice-layer data unit of the to-be-processed video bitstream; or when the reshaping parameter used for reshaping the reconstructed picture is the picture-layer reshaping parameter, encoding the picture-layer reshaping parameter, and writing encoded bits into the parameter data unit included in the AU of the video bitstream in which the bits of the current coding picture are included or into the picture-layer data unit and/or the slice-layer data unit of the to-be-processed video bitstream; when the reshaping parameter used for reshaping the reconstructed picture is the reshaping parameter used for reshaping the preceding encoded picture, encoding fourth identification information in the AU of the video bitstream in which the bits of the current coding picture are included or into the picture-layer data unit and/or the slice-layer data unit of the to-be-processed video bitstream, where the fourth identification information is used for indicating that the reshaping parameter is the reshaping parameter used for reshaping the preceding encoded picture. The parameter data unit is a data unit included in the AU independently of a slice bitstream data unit.

In an alternative embodiment, the method further includes: encoding identification information for indicating the reshaping parameter in at least one of the following manners: a manner of encoding first identification information used for indicating the reshaping parameter in a video parameter set (VPS), and a manner of encoding second identification information used for indicating the reshaping parameter in a sequence parameter set (SPS).

In an alternative embodiment, the determining a reshaping parameter used for reshaping the reconstructed picture according to the picture-layer reshaping parameter and the sequence-layer reshaping parameter includes: determining the reshaping parameter used for reshaping the reconstructed picture from the picture-layer reshaping parameter, the sequence-layer reshaping parameter as well as one or more first other reshaping parameters encoded in a used picture-layer parameter set and/or a used slice-layer parameter set other than the PPS in the slice header comprised in the AU corresponding to the reconstructed picture.

In an alternative embodiment, the determining the reshaping parameter used for reshaping the reconstructed picture from the picture-layer reshaping parameter, the sequence-layer reshaping parameter, and the first other reshaping parameter includes: reshaping the reconstructed picture by using the picture-layer reshaping parameter, reshaping the reconstructed picture by using the sequence-layer reshaping parameter, and reshaping the reconstructed picture by using the first other reshaping parameter; and determining that one of the picture-layer reshaping parameter, the sequence-layer reshaping parameter, and the first other reshaping parameter which minimizes the error between the HDR picture obtained by reshaping the reconstructed picture and the target HDR picture is the reshaping parameter used for reshaping the reconstructed picture.

In an alternative embodiment, the writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream includes: when the reshaping parameter used for reshaping the reconstructed picture is the sequence-layer reshaping parameter, in the slice header, encoding information of identifying that the picture-layer parameter set and/or the slice-layer parameter set other than the PPS is not used; when the reshaping picture used for reshaping the reconstructed picture is the first other reshaping parameter, in the slice header, encoding information of identifying that the picture-layer parameter set and/or the slice-layer parameter set other for the PPS is used, and encoding a parameter set identifier of the parameter set in which the first other reshaping parameter is located; when the reshaping parameter used for reshaping the reconstructed picture is the picture-layer reshaping parameter, encoding the picture-layer reshaping parameter and writing encoded bits into a newly created parameter set data unit, where the newly created parameter set data unit is configured with a parameter set identifier, and in the slice header, encoding information of identifying that picture-layer parameter set and/or the slice layer parameter set other for the PPS is used, and encoding the parameter set identifier.

In an alternative embodiment, the determining a reshaping parameter used for reshaping the reconstructed picture according to the picture-layer reshaping parameter and the sequence-layer reshaping parameter includes: determining the reshaping parameter used for reshaping the reconstructed picture from the picture-layer reshaping parameter, the sequence-layer reshaping parameter and one or more second other reshaping parameters encoded in a system layer of a transport stream or a media file.

In an alternative embodiment, the determining the reshaping parameter used for reshaping the reconstructed picture from the picture-layer reshaping parameter, the sequence-layer reshaping parameter and the one or more second other reshaping parameter includes: reshaping the reconstructed picture by using the picture-layer reshaping parameter, reshaping the reconstructed picture by using the sequence-layer reshaping parameter, and reshaping the reconstructed picture by using the second other reshaping parameter; and determining that one of the picture-layer reshaping parameter, the sequence-layer reshaping parameter, and the second other reshaping parameter which minimizes the error between the HDR picture obtained by reshaping process the reconstructed picture and the target HDR picture is the reshaping parameter used for reshaping the reconstructed picture.

In an alternative embodiment, the writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream includes: when the reshaping parameter used for reshaping the reconstructed picture is the sequence-layer reshaping parameter, encoding fifth identification information in the system layer, where the fifth identification information is used for indicating that the reshaping parameter used for reshaping the reconstructed picture does not use the reshaping parameter which has been encoded in the system layer; when the reshaping parameter used for reshaping the reconstructed picture is the picture-layer reshaping parameter, encoding the picture-layer reshaping parameter in the system layer; when the reshaping parameter used for reshaping the reconstructed picture is the second other reshaping parameter, encoding the second other reshaping parameter in the system layer, or encoding sixth identification information in the system layer. The sixth identification information is used for indicating that the reshaping parameter used for reshaping the reconstructed picture uses the reshaping parameter which has been encoded in the system layer.

In an alternative embodiment, a reshaping parameter used for performing a secondary reshaping on the reconstructed picture and control information used for indicating an execution mode of the secondary reshaping are encoded in the system layer.

According to another aspect of the embodiments of the present disclosure, there is provided a picture decoding device including a first determination module and a processing module. The first determination module is configured to parse a video bitstream to obtain a reshaping parameter from a picture-layer data unit and/or a slice-layer data unit of the video bitstream, and determine a reshaping parameter used for reshaping a reconstructed picture according to the obtained reshaping parameter. The processing module is configured to reshape the reconstructed picture by using the reshaping parameter used for reshaping the reconstructed picture. The reconstructed picture is a picture obtained by decoding the video bitstream before the reshaping is performed, and the picture-layer data unit and/or the slice-layer data unit comprises at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

According to another aspect of the embodiments of the present disclosure, there is provided a picture encoding device including a second determination module and a writing module. The second determination module is configured to determine a reshaping parameter used for reshaping a reconstructed picture for converting the reconstructed picture into a high dynamic range (HDR) video picture. The reconstructed picture is a standard dynamic range (SDR) picture obtained by locally reconstructing a current coding picture by an encoder before the encoder performs reshaping, or the reconstructed picture is an SDR picture obtained by decoding a to-be-processed video bitstream. The writing module is configured to write the determined reshaping parameter used for reshaping the reconstructed picture into a picture-layer data unit and/or a slice-layer data unit of the video bitstream in which the bits of the current coding picture are included or into the picture-layer data unit and/or the slice-layer data unit of the to-be-processed video bitstream. The picture-level data unit and/or the slice-layer data unit comprises at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

According to another aspect of the embodiments of the present disclosure, there is provided a decoder including the picture decoding device described above.

According to another aspect of an embodiments of the present disclosure, there is provided an encoder including the picture encoding device described above.

Another embodiment of the present disclosure provides a computer storage medium, which stores executable instructions, and the executable instructions are configured to perform one of or a combination of the steps in the above embodiments.

By means of embodiments of the present disclosure, a video bitstream is parsed to obtain a reshaping parameter from a picture-layer data unit and/or a slice-layer data unit of the video bitstream, and a reshaping parameter used for reshaping a reconstructed picture is determined according to the obtained reshaping parameter; and the reconstructed picture is reshaped by using the reshaping parameter used for reshaping the reconstructed picture. The reconstructed picture is a picture obtained by decoding the video bitstream before the reshaping is performed. The above picture-layer data unit and/or the slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit. Accordingly, the problems of poor viewing quality of a video and high encoding overhead of the reshaping parameter in the related art are solved, and further the effects of improving the viewing quality of the video and reducing the encoding overhead of the reshaping parameter are achieved.

BRIEF DESCRIPTION OF DRAWINGS

Accompanying drawings described herein are provided to provide a further understanding of the present disclosure, and constitute a part of the present disclosure. Exemplary embodiments of the present disclosure and descriptions thereof are used to explain the present disclosure, and do not constitute improper limits to the present disclosure. In the accompanying drawing.

DETAILED DESCRIPTION

Hereinafter, the present disclosure will be described in detail with reference to accompanying drawings and in conjunction with embodiments. It should be noted that the embodiments in the present disclosure and features in the embodiments may be combined with each other without conflict.

It should be noted that terms "first", "second", and the like in the description and claims of the present disclosure and the foregoing accompanying drawings are used to distinguish similar objects and do not necessarily describe a specific sequence or precedence order.

Figure 1:
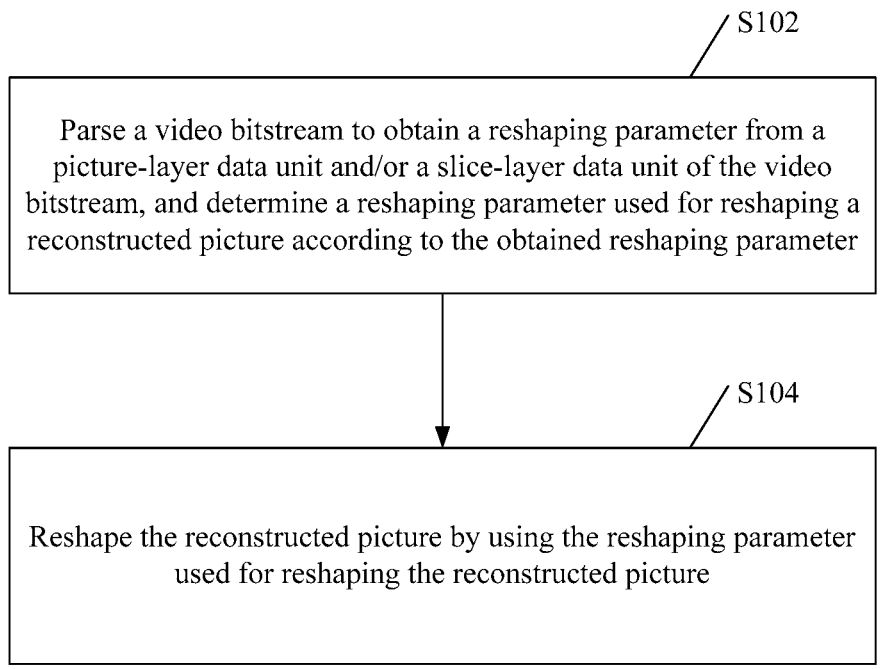
FIG. 1 is a flowchart of a picture decoding method according to an embodiment of the present disclosure.

In this embodiment, a picture decoding method is provided. FIG. 1 is a flowchart of a picture decoding method according to an embodiment of the present disclosure. As shown in FIG. 1, the flow includes the following steps.

In step S102, a video bitstream is parsed to obtain a reshaping parameter from a picture-layer data unit and/or a slice-layer data unit of the video bitstream, and a reshaping parameter used for reshaping a reconstructed picture is determined according to the obtained reshaping parameter.

In step S104, the reconstructed picture is reshaped by using the reshaping parameter used for reshaping the reconstructed picture. The reconstructed picture is a picture obtained by decoding the video bitstream before the reshaping is performed. The above picture-layer data unit and/or slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

Actions in the above embodiment may be implemented by a decoding device, for example, a decoder.

It can be known from the above embodiment that the reshaping parameter used for reshaping the reconstructed picture is determined according to the reshaping parameter obtained from the picture-layer data unit and/or slice-layer data unit of the video bitstream, which may effectively improve the viewing quality of the picture and further improve the viewing quality of a video, and may reduce the encoding overhead of the reshaping parameter. With the above steps, the problems of poor viewing quality of the video and high encoding overhead of the reshaping parameter in the related art are solved, and further the effects of improving the viewing quality of the video and reducing the encoding overhead of the reshaping parameter are achieved.

In an alternative embodiment, before the reshaping parameter is obtained from the picture-layer data unit and/or slice-layer data unit of the video bitstream and the reshaping parameter used for reshaping the reconstructed picture is determined according to the obtained reshaping parameter, the method further includes: a PPS identifier in the slice header included in the AU in the video bitstream is determined, and the reshaping parameter used for reshaping the reconstructed picture is obtained according to the PPS referred to by using the PPS identifier.

There are multiple manners for obtaining the reshaping parameter used for reshaping the reconstructed picture according to the PPS indexed by the above parameter set identifier. One of these manners will be described below as an example. It is determined whether an extended part of the PPS and/or a parameter set referred to by the PPS carry or carries a first reshaping parameter. When the extended part of the PPS and/or the parameter set indexed by the PPS carry or carries the first reshaping parameter, it is determined that the obtained reshaping parameter used for reshaping the reconstructed picture is the first reshaping parameter; and/or, when the extended part of the PPS and/or the parameter set indexed by the PPS do not or does not carry the first reshaping parameter, it is determined that the obtained reshaping parameter used for reshaping the reconstructed picture is a preset value or is null. A case where the above video bitstream is an HDR video bitstream will be described below as an example.

The decoding device parses the PPS identifier in the slice header included in each AU in the HDR video bitstream, and searches the received PPSs for a PPS, an identifier in a PPS data unit of which is the same as the parameter set identifier obtained by parsing the slice header. The decoding device activates the PPS to parse an encoded bit in the PPS data unit. If the reshaping parameter is obtained by parsing the extended part of the PPS, the reshaping parameter is set to the reshaping parameter used for reshaping a slice referencing the PPS. Otherwise, if the reshaping parameter is not obtained by parsing the extended part of the PPS, the reshaping parameter used for reshaping the slice referencing the PPS is set to null, or is set to a preset value.

It can be known from the above embodiment that the picture-layer data unit and/or the slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit. The operation involved in the above step S102 will be described below in conjunction with various picture-layer data units and/or slice-layer data units respectively.

In an alternative embodiment, the above picture-layer data unit and/or the slice-layer data unit may be the slice header. In the present embodiment, the process of obtaining the reshaping parameter from the picture-layer data unit and/or the slice-layer data unit of the above video bitstream and determining the reshaping parameter used for reshaping the reconstructed picture according to the obtained reshaping parameter includes: the extended part of the slice header is parsed to obtain a second reshaping parameter, and the reshaping parameter used for reshaping the reconstructed picture is updated or re-determined with the second reshaping parameter. The relevant operation when the picture-layer data unit and/or the slice-layer data unit may be the slice header will be described below in conjunction with an alternative embodiment.

A First Alternative Embodiment

The present embodiment relates to an HDR video decoding method and an HDR video decoding device. An input to the device is an HDR video bitstream or a transport stream or media file including the HDR video bitstream, and an output of the device is a reconstructed HDR video for playing. The present embodiment includes the following steps.

In step 1, a video bitstream is parsed to obtain a reshaping parameter from a picture-layer data unit and/or a slice-layer data unit.

A decoding device parses the inputted video bitstream. If the input video bitstream is a transport stream or a media file including the HDR video bitstream, the HDR video bitstream is extracted from the transport stream or media file.

The decoding device parses a PPS identifier in the slice header included in each AU of the HDR video bitstream, and searches the received PPS for a PPS, an identifier in a PPS data unit of which is the same as the parameter set identifier obtained by parsing the slice header.

The decoding device activates the PPS, and parses encoded bits in the PPS data unit. If the reshaping parameter is obtained by parsing the extended part of the PPS, the reshaping parameter is set to the reshaping parameter (corresponding to the above first reshaping parameter) used for reshaping a slice referencing the PPS. Otherwise, if the reshaping parameter is not obtained by parsing the extended part of the PPS, the reshaping parameter used for reshaping the slice referencing the PPS is set to null, or is set to a preset value.

The decoding device parses the slice header. If the reshaping parameter (corresponding to the above second reshaping parameter) is obtained by parsing the extended part of the slice header, the reshaping parameter is set to the reshaping parameter used for reshaping the slice, that is, the reshaping parameter obtained by parsing the extended part of the slice header is used for overriding the reshaping parameter or preset value obtained by the PPS referred to by the slice. Otherwise, if the reshaping parameter is not obtained by parsing the extended part of the slice header, the reshaping parameter or preset value obtained by parsing the extended part of the PPS referred to by the slice is used.

In particular, when identification information of "whether it is necessary to reshape the reconstructed SDR picture of this picture" obtained from the HDR video bitstream indicates that "there is no need to reshape the reconstructed SDR picture of the picture", the decoding device may skip a reshaping parameter parsing step and a step of reshaping the SDR picture. Despite all this, the decoding device still needs to convert a decoded picture into a video data format suitable for playback.

In step 2, the video bitstream is decoded to obtain a reconstructed picture.

The decoding device decodes the HDR video bitstream to obtain a reconstructed SDR video.

In step 3, according to the reshaping parameter used for reshaping the reconstructed picture, the reconstructed SDR picture is reshaped and converted into an HDR picture.

By using the above method, the decoding device uses the reshaping parameter obtained from the PPS to reshape the reconstructed SDR video when source characteristics (which may include but are not limited to: dynamic range, color gamut, lossy compression distortion, etc.) of the reconstructed SDR picture are the same or similar to those of most of the pictures in a sequence. When the source characteristics of the reconstructed SDR picture are quite different from those of most of the pictures in the sequence, the decoding device can obtain the reshaping parameter related to the source characteristics of the reconstructed picture from the extended part of the slice header, and reshape the reconstructed SDR picture according to the reshaping parameter, thereby improving the viewing quality of the HDR picture obtained by the reshaping process. In this way, the operation of frequently updating the PPS by the decoding device due to the change of a picture-layer reshaping parameter is avoided.

In an alternative embodiment, the above picture-layer and/or slice-layer data unit may be a parameter data unit included in the AU. In the present embodiment, the process of obtaining a reshaping parameter from a picture-layer and/or slice-layer data unit of the video bitstream and determining a reshaping parameter used for reshaping a reconstructed picture according to the obtained reshaping parameter includes: a parameter data unit included in the AU of the video bitstream is parsed to obtain a third reshaping parameter, where the parameter data unit is a data unit included in the AU independently of a slice bitstream data unit; the reshaping parameter used for reshaping the reconstructed picture is updated or re-determined by using the third reshaping parameter; or it is determined that the reshaping parameter used for reshaping the reconstructed picture is the third reshaping parameter according to a pre-configured reshaping parameter determination manner.

Alternatively, the process of updating or re-determining the reshaping parameter used for reshaping the reconstructed picture by using the third reshaping parameter includes: a PPS identifier in the slice header included in the AU of the video bitstream is determined; and the reshaping parameter used for reshaping the reconstructed picture is obtained according to the PPS referred to by using the PPS identifier; and the obtained reshaping parameter used for reshaping the reconstructed picture is updated or re-determined by using the third reshaping parameter. There may be multiple manners for obtaining the reshaping parameter used for reshaping the reconstructed picture by the PPS indexed by the above parameter set identifier. For example, the reshaping parameter used for reshaping the reconstructed picture may be obtained in the following manners. It is determined whether an extended part of the PPS and/or a parameter set referred to by the PPS carry or carries a first reshaping parameter. When it is determined that the extended part of the PPS and/or the parameter set referred to by the PPS carry or carries the first reshaping parameter, the acquired reshaping parameter used for reshaping the reconstructed picture is the first reshaping parameter; and/or, when it is determined that the extended part of the PPS and/or the parameter set referred to by the PPS does not carry the first reshaping parameter, the obtained reshaping parameter used for reshaping the reconstructed picture is a preset value or is null.

The above third reshaping parameter may also be determined in the following manner. The parameter data unit included in the preceding AU of the above AU is parsed to obtain a fourth reshaping parameter. The preceding AU may be the preceding AU of the current to-be-decoded AU (i.e., the above AU) according to a decoding order of AUs.

The above pre-configured reshaping parameter determination manner may include at least one of the following: a default determination manner, a determination manner of using first identification information obtained by parsing a video parameter set (VPS) to indicate the reshaping parameter, and a determination manner of using second identification information obtained by parsing a sequence parameter set (SPS) to indicate the reshaping parameter. The above default manner may be one determination manner which has been configured in advance. The operation when the above picture-layer data unit and/or slice-layer data unit is a parameter data unit included in the AU will be described below in combination with an alternative embodiment.

A Second Alternative Embodiment

The present embodiment relates to an HDR video decoding method and an HDR video decoding device. An input to the device is an HDR video bitstream or a transport stream or media file including the HDR video bitstream, and an output of the device is a reconstructed HDR video for playback. The present embodiment includes the following steps.

In step 1, a bitstream is parsed to obtain a reshaping parameter from a picture-layer data unit and/or a slice-layer data unit.

A decoding device parses the inputted bitstream. If the inputted bitstream is a transport stream or a media file including the HDR video bitstream, the HDR video bitstream is extracted from the transport stream or media file.

The decoding device parses a PPS identifier in the slice header included in each AU of the HDR video bitstream, and searches the received PPS for a PPS an identifier in a PPS data unit of which is the same as the parameter set identifier obtained by parsing the slice header.

The decoding device activates the PPS, and parses encoded bits in the PPS data unit. If the reshaping parameter (corresponding to the above first reshaping parameter) is obtained by parsing the extended part of the PPS, the reshaping parameter is set to the reshaping parameter used for reshaping a slice referencing the PPS. Otherwise, if the reshaping parameter is not obtained by parsing the extended part of the PPS, the reshaping parameter used for reshaping the slice referencing the PPS is set to null, or is set to a preset value.

If the decoding device detects that the parameter data unit is included in the AU, the data parameter data unit is parsed to obtain a reshaping parameter (corresponding to the above third reshaping parameter) for reshaping the reconstructed SDR picture obtained after a slice included in the AU is decoded, and the reshaping parameter is set to the reshaping parameter for reshaping the reconstructed SDR picture. Otherwise, if the decoding device detects that the parameter data unit is not included in the AU, the reshaping parameter obtained by parsing the PPS referred to by the slice included in the AU is set to the reshaping parameter for reshaping the reconstructed SDR picture. Here, the parameter data unit is a data unit included in the AU independently of a slice bitstream data unit, for example, a parameter set and supplemental enhancement information (SEI) data unit, a user-defined data unit and the like.

Alternatively, when the decoding device detects that the AU includes the parameter data unit, the decoding device may be configured to set the reshaping parameter (corresponding to the above fourth reshaping parameter) obtained by parsing the parameter data unit included in the preceding AU of a current to-be-decoded AU according to an AU decoding order to a candidate reshaping parameter (corresponding to the above third reshaping parameter) for reshaping the reconstructed SDR picture obtained by the decoding current AU. Another set of candidate reshaping parameters is the reshaping parameters obtained by parsing the PPS. The decoding device parses the slice header included in the to-be-decoded AU to obtain identification information indicating that which set of candidate reshaping parameters is used, and uses the corresponding reshaping parameter to reshape the constructed SDR picture according to the identification information. Here, a configuration method of the decoding device may be as follows: the decoding device adopts the above method by default; or, the decoding device parses a video parameter set (VPS) and/or a SPS to obtain the identification information (the identification information parsed from the VPS corresponds to the first identification information, and the identification information parsed from the SPS corresponds to the second identification information) indicating whether the above method is used, and the decoding device configures whether to use the reshaping parameter included in the parameter data unit in the decoded AU according to the identification information.

In particular, when identification information indicating "whether it is necessary to reshape the reconstructed SDR picture of this picture" obtained by the decoding device from the HDR video bitstream indicates that "there is no need to reshape the reconstructed SDR picture of the picture", the decoding device may skip a reshaping parameter parsing step and a step of reshaping the SDR picture. Despite all this, the decoding device still needs to convert a decoded picture into a video data format suitable for playback.

In step 2, the step 2 is the same as the step 2 in the first alternative embodiment, which will be omitted here.

In step 3, the step 3 is the same as the step 3 in the first alternative embodiment, which will be omitted here.

It should be noted that in this alternative embodiment, the operation of obtaining the reshaping parameter by parsing the PPS in the slice header included in each AU in the HDR video bitstream may be carried out after the operation of obtaining the reshaping parameter by parsing the parameter data unit included in the AU.

Compared with the decoding device described in the first alternative embodiment, the decoding device in the present embodiment obtains the reshaping parameter used for reshaping all the slices in the AU by parsing the parameter data units in the AU, which may further reduce the overhead of parsing the slice header.

In one alternative embodiment, the above picture-layer data unit and/or slice-layer data unit may be slice header included in the AU. In the present embodiment, the process of obtaining the reshaping parameter from a picture-layer and/or slice-layer data unit of the video bitstream and determining a reshaping parameter used for reshaping a reconstructed picture according to the obtained reshaping parameter includes: slice header included in the AU is parsed to obtain third identification information. The third identification information is used for indicating whether the reshaping parameter used for reshaping the reconstructed picture is determined according to a picture-layer parameter set and/or a slice-layer parameter set other than the PPS. When the third identification information indicates that the reshaping parameter used for reshaping the reconstructed picture is determined according to the picture-layer parameter set and/or the slice-layer parameter set other than the PPS, the slice header included in the AU is parsed to obtain an identifier of the picture-layer parameter set and/or the slice-layer parameter set other than the PPS, and a parameter set whose identifier is the same as the identifier of the picture-layer parameter set and/or the slice-layer parameter set other than the PPS is activated to obtain a fifth reshaping parameter. The obtained reshaping parameter used for reshaping the reconstructed picture is updated or re-determined by using the fifth reshaping parameter. The relevant operation when the picture-layer data unit and/or the slice-layer data unit is the slice header included in the AU will be described below in combination with one alternative embodiment.

A Third Alternative Embodiment

The present embodiment relates to an HDR video decoding method and an HDR video decoding device. An input to the device is an HDR video bitstream or a transport stream or media file including the HDR video bitstream, and an output of the device is a reconstructed HDR video for playback. The present embodiment includes the following steps.

In step 1, a bitstream is parsed to obtain a reshaping parameter from a picture-layer data unit and/or a slice-layer data unit.

The decoding device parses the inputted bitstream. If the inputted bitstream is a transport stream or a media file including the HDR video bitstream, the HDR video bitstream is extracted from the transport stream or media file.

The decoding device parses a PPS identifier in the slice header included in each AU in the HDR video bitstream, and arches the received PPS for a PPS an identifier in a PPS data unit of which is the same as the parameter set identifier obtained by parsing the slice header.

The decoding device activates the PPS, and parses encoded bits in the PPS data unit. If the reshaping parameter (corresponding to the above first reshaping parameter) is obtained by parsing the extended part of the PPS, the reshaping parameter is set to the reshaping parameter used for reshaping a slice referencing the PPS. Otherwise, if the reshaping parameter is not obtained by parsing the extended part of the PPS, the reshaping parameter used for reshaping the slice referencing the PPS is set to null, or is set to a preset value.

The decoding device parses the slice header to obtain the identification information indicating whether to use the picture-layer parameter set/slice-layer parameter set other than the PPS. If the identification information indicates "not using the picture-layer parameter set/slice-layer parameter set other than the PPS", the reconstructed SDR picture is reshaped by using the reshaping parameter obtained by parsing the extended part of the PPS.

Otherwise, if the identification information indicates "using the picture-layer parameter set/slice-layer parameter set other than the PPS", the slice header is continuously parsed to obtain the identifier of the picture-layer parameter set/slice-layer parameter set, and a parameter set whose identifier is the same as the parameter set identifier obtained by parsing the slice header is found from the received bitstream or the decoded parameter set data unit. The decoding device parses the parameter set to obtain a reshaping parameter (corresponding to the above fifth reshaping parameter), and reshapes the decoded reconstructed SDR picture using the reshaping parameter. In the above process, the decoding device may find the picture-layer/slice layer-parameter set by searching the received AU and a parameter set bitstream transmitted outside the AU. Alternatively, since the processed HDR video bitstream may include more picture-layer/slice-layer parameter sets with different parameter set identifiers, in order to reduce the processing complexity of searching for the parameter set by the decoding device, the decoding device uses one data structure with the parameter set identifier as an access parameter. For example, one implementation manner may be an array of pointers with the parameter set identifier as the access parameter. The pointers in the array point to parsed data that stores the parameter set corresponding to the parameter set identifier. After the decoding device obtains the parameter set identifier by parsing the slice header, the device may directly access the data structure with the parameter set identifier as an entry parameter, and obtain the reshaping parameter included in the corresponding parameter set.

In particular, when identification information indicating "whether it is necessary to reshape the reconstructed SDR picture of this picture" obtained from the HDR video bitstream indicates that there is no need to reshape the reconstructed SDR picture of the picture, the decoding device may skip a reshaping parameter parsing step and a step of reshaping the SDR picture. Despite all this, the decoding device still needs to convert a decoded picture into a video data format suitable for playback.

In step 2, the step 2 is the same as the step 2 in the second alternative embodiment, which will be omitted here.

In step 3, the step 3 is the same as the step 3 in the second alternative embodiment, which will be omitted here.

Compared with the decoding device in the second alternative embodiment, the decoding device in the present embodiment obtains the reshaping parameter used for reshaping the slice by parsing the picture-layer parameter set/slice-layer parameter set different from the PPS. This enables the decoding device to select the reshaping parameter which is not to be limited to the preceding decoding AU, which improves the utilization of the decoded information. At the same time, with the aid of the attribute of the parameter set itself, the decoding device may more easily decide whether there is a packet loss situation or not. For example, after the decoding device parses a parameter set sequence number of the slice header, the parameter set with the same parameter set sequence number is not found in the received parameter set. In this case, the decoding device may enable an error handling mechanism to perform error recovery, which improves the reliability of video communications.

In one alternative embodiment, the above picture-layer data unit and/or the slice-layer data unit may be a system-layer picture parameter data unit. In the present embodiment, the process of parsing the video bitstream to obtain a reshaping parameter from a picture-layer data unit and/or a slice-layer data unit of the video bitstream and determining a reshaping parameter used for reshaping a reconstructed picture according to the obtained reshaping parameter includes: a sixth reshaping parameter is obtained from a system-layer picture parameter data unit in a transport stream or a media file for carrying the video bitstream; the reshaping parameter used for reshaping the reconstructed picture is updated or re-determined by using the sixth reshaping parameter; or it is determined that the reshaping parameter used for reshaping the reconstructed picture is the sixth reshaping parameter. The system-layer picture parameter data unit includes description information or auxiliary information corresponding to the access unit (AU) of the video bitstream.

In an alternative embodiment, the process of updating or re-determining the reshaping parameter used for reshaping the reconstructed picture by using the sixth reshaping parameter includes: a PPS identifier in the slice header included in the AU of the video bitstream is determined, the reshaping parameter used for reshaping the reconstructed picture is obtained according to the PPS referred to by using the PPS identifier; and the reshaping parameter used for reshaping the reconstructed picture is updated or re-determined by using the sixth reshaping parameter.

In one alternative embodiment, the process of obtaining the reshaping parameter used for reshaping the reconstructed picture according to the PPS indexed by the parameter set identifier includes: it is determined whether an extended part of the PPS and/or a parameter set referred to by the PPS carry or carries a first reshaping parameter. When the extended part of the PPS and/or the parameter set referred to by the PPS carry or carries the first reshaping parameter, it is determined that the obtained reshaping parameter used for reshaping the reconstructed picture is the first reshaping parameter; and/or, when the extended part of the PPS and/or a parameter set referred to by the PPS does not carry the first reshaping parameter, it is determined that the obtained reshaping parameter used for reshaping the reconstructed picture is a preset value or is null.

In an alternative embodiment, the process of obtaining the reshaping parameter from a system-layer picture parameter data unit in a transport stream or a media file for carrying the video bitstream includes: the reshaping parameter is determined according to at least one of the following parameters obtained from the system-layer picture parameter data unit: an identification parameter indicating whether to perform the reshaping or not, a reshaping parameter of the dynamic range, a reshaping parameter of the color gamut, and a use range of the reshaping parameter.

In an alternative embodiment, in order to ensure the quality of the video, the above reconstructed picture may be reshaped for multiple times (for instance, subjected to two reshaping processes). The present embodiment will be described below: the reshaping parameter for performing a secondary reshaping process on the reconstructed picture is obtained from a system-layer picture parameter data unit (which may also be another system layer information unit) in a transport stream or media file used for carrying the video bitstream. The system-layer picture parameter data unit includes description information or auxiliary information corresponding to the access unit (AU) of the video bitstream. The reconstructed picture is subjected to the secondary reshaping process by using the obtained reshaping parameter for performing the secondary reshaping process on the reconstructed picture. It should be noted that the obtaining the reshaping parameter used for performing the secondary reshaping process may be carried out before obtaining the reshaping parameter used for reshaping the reconstructed picture.

In an alternative embodiment, the step of obtaining a reshaping parameter for performing a secondary reshaping process on the reconstructed picture from a system-layer picture parameter data unit in a transport stream or a media file for carrying the video bitstream includes: the reshaping parameter for performing the secondary reshaping process on the reconstructed picture is determined according to at least one of the following parameters obtained from the system-layer picture parameter data unit: an identification parameter indicating whether to perform reshaping or not, a reshaping parameter of the dynamic range, a reshaping parameter of the color gamut, and a use range of the reshaping parameter.

The relevant operations when the above picture-layer data unit and/or slice-layer data unit is the system-layer picture parameter data unit will be described below in combination with one alternative embodiment.

A Fourth Alternative Embodiment

The present embodiment relates to an HDR video decoding method and an HDR video decoding device. An input to the device is an HDR video bitstream or a transport stream or media file including the HDR video bitstream, and an output of the device is a reconstructed HDR video for playback. The present embodiment includes the following steps.

In step 1, a bitstream is parsed to obtain a reshaping parameter from a picture and/or slice layer data unit.

The decoding device parses the inputted bitstream. If the inputted bitstream is a transport stream or a media file including the HDR video bitstream, the HDR video bitstream is extracted from the transport stream or media file. The decoding device parses a PPS identifier in the slice header included in each AU in the HDR video bitstream, and searches the received PPS for a PPS an identifier in a PPS data unit of which is the same as the parameter set identifier obtained by parsing the slice header.

The decoding device activates the PPS, and parses encoded bits in the PPS data unit. If the reshaping parameter (corresponding to the above first reshaping parameter) is obtained by parsing the extended part of the PPS, the reshaping parameter is set to the reshaping parameter used for reshaping a slice referencing the PPS. Otherwise, if the reshaping parameter is not obtained by parsing the extended part of the PPS, the reshaping parameter used for reshaping the slice referencing the PPS is set to null, or is set to a preset value.

The decoding device parses system-layer information units (for example, system-layer picture parameter data units) in a transport stream or a media file to obtain a reshaping parameter for reshaping the reconstructed SDR picture. These system-layer information units may be description information or auxiliary information related to the AU in the HDR video bitstream in the transport stream or the media file, such as a descriptor. The decoding device obtains at least one of the following parameters from the system layer information units: an identification parameter indicating whether to perform reshaping, a reshaping parameter of a dynamic range, a reshaping parameter of a color gamut, and a use range of the reshaping parameter. The use range of the reshaping parameter is used for indicating the reshaping parameter used for reshaping the reconstructed SDR video (the candidate reshaping parameter may include, but is not limited to, a reshaping parameter obtained by parsing the PPS, the reshaping parameter obtained by parsing a system-layer bitstream, a default value or preset value of the reshaping parameter and the like) as well as a picture use range of the reshaping parameter (for example, from a specified AU in the HDR video bitstream to another specified AU). The decoding device determines the reshaping parameter used for reshaping the SDR picture obtained by decoding the AU according to the parameters in the system-layer information units.

Alternatively, the decoding device described in the present embodiment may also use the method for obtaining the reshaping parameter by parsing the HDR bitstream according to the first alternative embodiment, the second alternative embodiment, or the third alternative embodiment. Alternatively, after the reshaping parameter is determined by using the foregoing first, second or third embodiment, the method described in the present embodiment may be further used to obtain a system-layer reshaping parameter and a control parameter of the reshaping operation. The control parameter of the reshaping operation may indicate the reshaping parameter selected by the decoding device for reshaping the reconstructed SDR picture (for example, to select from the reshaping parameter obtained by parsing the HDR bitstream and the reshaping parameter obtained by parsing the system-layer bitstream), and may also indicate an execution mode of the reshaping operation. For example, the reconstructed SDR picture is firstly reshaped by using the reshaping parameter obtained by parsing the HDR bitstream, and then subjected to a secondary reshaping process by using the reshaping parameter obtained by parsing the system-layer bitstream. By means of such a cascaded reshaping processes, the reconstructed SDR picture may be reshaped with a gradually increasing precision, which improves the quality of the reconstructed HDR picture.

In particular, when identification information indicating "whether it is necessary to reshape the reconstructed SDR picture of this picture" obtained from the HDR video bitstream indicates that "there is no need to reshape the reconstructed the reconstructed SDR picture of the picture", the decoding device may skip the reshaping parameter parsing step and a step of reshaping the SDR picture. Despite all this, the decoding device still needs to convert a decoded picture into a video data format suitable for playback.

In step 2, the step 2 is the same as the step 2 in the third alternative embodiment, which will be omitted here.

In step 3, the step 3 is the same as the step 3 in the third alternative embodiment, which will be omitted here.

Compared with the decoding device described in the third alternative embodiment, the decoding device in the present embodiment obtains the reshaping parameter of the reconstructed SDR picture by parsing the system-layer bitstream in the transport stream or the media file. With the aid of the description information of the system layer about the HDR video bitstream included in the transport stream or the media file, the decoding device may relatively flexibly select the reshaping parameter to reshape the SDR picture. At the same time, alternatively, the decoding device may use the reshaping parameter of the system layer to perform "a secondary reshaping process" on the reconstructed SDR picture, which further improves the quality of the reconstructed HDR video.

Figure 2:
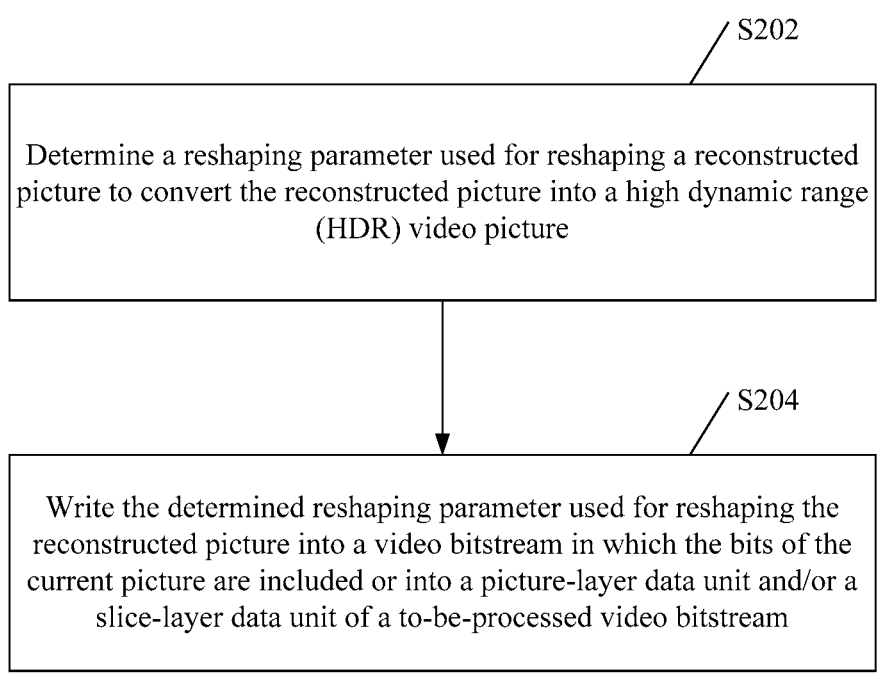
FIG. 2 is a flowchart of a picture encoding method according to an embodiment of the present disclosure.

According to another aspect of an embodiment of the present disclosure, there is further provided a picture encoding method. FIG. 2 is a flowchart of the picture encoding method according to an embodiment of the present disclosure. As shown in FIG. 2, the flow includes the following steps.

In step S202, determined is a reshaping parameter used by a reconstructed picture for converting the reconstructed picture into a high dynamic range (HDR) video picture. The reconstructed picture is a standard dynamic range (SDR) picture obtained by locally reconstructing a current coding picture by an encoder before the encoder performs a reshaping operation, or the reconstructed picture is the an SDR picture obtained by decoding a to-be-processed video bitstream.

In step S204, the determined reshaping parameter used by the reconstructed picture is written into the video bitstream in which the bits of the current coding picture are included or into a picture-layer data unit and/or a slice-layer data unit of a to-be-processed video bitstream. The above picture-layer data unit and/or slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

Actions in the above embodiment may be implemented by an encoding device, for example, an encoder.

It can be known from the above embodiment that the reshaping parameter used for reshaping the reconstructed picture is determined according to the reshaping parameter obtained from the picture-layer data unit and/or the slice-layer data unit of the video bitstream, which may effectively improve the viewing quality of a picture and further improve the viewing quality of a video, and may reduce the encoding overhead of the reshaping parameter. By means of the above steps, the problems of poor viewing quality of the video and high encoding overhead of the reshaping parameter in the related art are solved, and further the effects of improving the viewing quality of the video and reducing the encoding overhead of the reshaping parameter are achieved.

In one alternative embodiment, the process of determining a reshaping parameter used by a reconstructed picture for converting the reconstructed picture into a high dynamic range (HDR) video picture includes: a picture-layer reshaping parameter and a sequence-layer reshaping parameter are determined, and the reshaping parameter used for reshaping the reconstructed picture is determined according to the picture-layer reshaping parameter and the sequence-layer reshaping parameter. The picture-layer reshaping parameter includes a filter coefficient used in a reshaping process of minimizing an error between the reconstructed picture and a target HDR picture. The sequence-layer reshaping parameter includes a dynamic range and a color gamut of the target HDR video constructed according to the target HDR picture, a dynamic range and a color gamut of a reconstructed video constituted by the reconstructed picture, a determined mapping parameter from a dynamic range of the reconstructed video to a dynamic range of the target HDR video, and/or a conversion parameter from a color gamut of the reconstructed video to a color gamut of the target HDR video.

In an alternative embodiment, the above target HDR picture is an HDR picture corresponding to the reconstructed picture in an original HDR video inputted into an encoder.

There are many manners for determining the reshaping parameter used for reshaping the reconstructed picture according to the above picture-layer reshaping parameter and the above sequence-layer reshaping parameter, and these determination manners will be described below by way of an example.

In an alternative embodiment, a reshaping parameter used for reshaping the reconstructed picture may be determined in the following manners. The reconstructed picture is reshaped respectively by using the picture-layer reshaping parameter and by using the sequence-layer reshaping parameter. One of picture-layer reshaping parameter and the sequence-layer reshaping parameter that minimizes the error between the HDR picture obtained by reshaping the reconstructed picture and the target HDR picture is determined as the reshaping parameter used for reshaping the reconstructed picture. Alternatively, the process of writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream is as follow. When the reshaping parameter used for reshaping the reconstructed picture is the sequence-layer reshaping parameter, the sequence-layer reshaping parameter is encoded, and encoded bits are written into the picture parameter set (PPS) and/or the parameter set referred to by the PPS of the video bitstream in which the bits of the current coding picture are included or the to-be-processed video bitstream. When the reshaping parameter used for reshaping the reconstructed picture is the picture-layer reshaping parameter, the picture-layer reshaping parameter is encoded, and encoded bits are written into the slice header included in the access unit (AU) in the video bitstream in which the bits of the current coding picture are included or in the to-be-processed video bitstream. It will be described below in combination with one alternative embodiment. It will be described below in combination with one alternative embodiment.

A Fifth Alternative Embodiment

The present embodiment provides an HDR video encoding method corresponding to the decoding method according to the first alternative embodiment, and an HDR video encoding device. A bitstream generated by the device may be correctly processed by the decoding apparatus in the first alternative embodiment. An input to the apparatus in the present embodiment is an original HDR video, and the output of the apparatus is an HDR video bitstream or a transport stream or media file including the HDR video bitstream. The present embodiment includes the following steps.

In step 1, the inputted original HDR video is reshaped to obtain an SDR input video suitable for a H.265/HEVC Main 10 Profile encoder. The encoder is used for encoding the input video to obtain an encoder-locally-reconstructed SDR video.

The reshaping process in this step may be applied to a picture in an HDR video sequence, so as to reduce the dynamic range of the HDR picture. At the same time, a conversion operation performed on a color gamut of the HDR picture is selected according to an application setting. Alternatively, when the SDR video to be decoded and reconstructed by a receiving end has the same color gamut as the original HDR video, the conversion operation on the color gamut is not performed, and when the color gamut of the SDR video to be decoded and reconstructed by the receiving end is different from that of the original HDR video, the conversion operation on the color gamut is performed. Here, the reshaping process on the inputted HDR video may use the existing method in the aforementioned International Standard Organization test model. Parameters of the dynamic range and the color gamut of the target SDR video outputted in the reshaping process may be set according to actual application requirements.

In step 2, the reshaping parameter of the reshaping process of converting SDR picture reconstructed by the encoder into an HDR picture is calculated.

For the SDR video picture decoded and reconstructed by the encoder, by using the corresponding inputted original HDR picture as a reference, the reshaping parameter for reshaping the SDR picture is determined. The reshaping operation includes: increasing the dynamic range of the SDR picture, and at the same time, selecting the conversion operation performed on the color gamut of the SDR picture according to the application setting. Alternatively, when the HDR video required by the receiving end has the same color gamut as the decoded and reconstructed SDR video, no conversion operation on the color gamut is performed; otherwise, the conversion operation on the color gamut is performed.

In general, the HDR picture has a much larger dynamic range than the SDR picture. At the same time, the HDR picture uses a color gamut that overrides a larger area on a gamut diagram. Accordingly, in reshaping, it is necessary to "extend" the dynamic range and the color gamut of the SDR picture. One method is to use an adaptive filtering method to calculate a filter coefficient that may be used in a reshaping process of minimizing an error between a picture obtained by reshaping the SDR picture and an original HDR input picture, and to use the coefficient as the reshaping parameter (that is, "picture-layer reshaping parameter") in the reshaping process. Since the encoder-locally decoded and reconstructed SDR picture is used in a process of determining the picture-layer reshaping parameter, the determined picture-layer reshaping parameter may compensate the lossy compression distortion in the reconstructed SDR picture.

Another method for determining the reshaping parameter is to calculate a mapping parameter extending from the dynamic range of the SDR video to the dynamic range of the HDR video according to the dynamic range and the color gamut of the original input HDR video as well as the dynamic range and the color gamut of the locally decoded and reconstructed SDR video, to calculate a conversion parameter from the color gamut of the SDR video to the color gamut of the HDR video, and to use the mapping parameter and the conversion parameter as the reshaping parameter (i.e., "sequence-layer reshaping parameter") in the reshaping process.

Alternatively, in the conversion process of the dynamic range, an average dynamic range of an SDR video sequence and an original HDR sequence is firstly determined, a correspondence curve of mapping values of pixel sampling points within the dynamic range of the SDR video to the dynamic range of the HDR video is calculated according to a curve between the values of the pixel sampling points and corresponding light intensities in the video under different dynamic ranges, and a parameter of the curve serves as the mapping parameter. Since an area overridden by the color gamut of the SDR video on the gamut diagram is less than that overridden by the color gamut of the HDR video, a simple method is to directly convert a value corresponding to a color point in the color gamut of the SDR video into a value corresponding to the same color point in the color gamut of the HDR video, and use a calculating parameter used in the conversion process as a conversion parameter. Another color gamut conversion method is to extend and map the point on the same chrominance line in the color gamut of the SDR video to the color point on the same chrominance line in the color gamut of the HDR video, and use the parameter corresponding to the mapping curve as the conversion parameter. Such a method may extend the color point in the color gamut of the original SDR video to a color gamut overridden by the color gamut of the HDR video but not overridden by the color gamut of the SDR video, which improves the color saturation of the HDR video.

In a process of encoding the HDR video, the encoding device may firstly determine the "sequence-layer reshaping parameter". The encoding device may analyze the inputted HDR video and the encoder reconstructed SDR video to determine the dynamic range and the color gamut of the video; and the encoding device may also directly determine the dynamic range and the color gamut of the HDR video and the dynamic range and the color gamut of the SDR video according to setting parameters, such as a parameter used for indicating the dynamic range and the color gamut of the input HDR video in configuration parameters inputted together with the HDR video, and a parameter used in the step 1 for indicating the dynamic range and the color gamut in converting the HDR video into the target SDR video.

In particular, the encoding device may determine whether it is necessary to reshape the encoder reconstructed SDR picture or not, and encode, for the picture, identification information indicating whether it is necessary to reshape the reconstructed SDR picture of this picture. A determining method that may be used by the encoding device is as follow. The encoding device detects a difference in dynamic range of the reconstructed SDR picture and the dynamic range of the original input HDR picture. When the dynamic range of the reconstructed SDR picture and the dynamic range of the original input HDR picture are the same or there are fewer corresponding pixel points in the inputted HDR picture outside the dynamic range of the SDR picture, or the influence of the corresponding pixel points in the inputted HDR picture outside the dynamic range of the SDR picture on the video viewing quality may be neglected in accordance with the selected HDR video quality evaluation criteria, the dynamic range is not reshaped. Similarly, when the encoding device detects that colors corresponding to the pixel sampling values in the original inputted HDR picture are within the color gamut overridden by the color gamut of the SDR picture, or that there are fewer pixels in the corresponding inputted HDR picture outside the color gamut of the SDR picture, or the influence of the corresponding pixel points in the input HDR picture outside the color gamut of the SDR picture on the video viewing quality may be neglected in accordance with the selected HDR video quality evaluation criteria, the color gamut is not reshaped. The HDR video quality evaluation criterion may use the existing error criterion for evaluating the quality of the HDR video in the standard organization test model and reference software. When the encoding device determines that it is not necessary to reshape the reconstructed SDR video, identification information indicating "there is no need to reshape the reconstructed SDR picture of the picture" is encoded for the picture. The encoding device does not need to perform the step 2 and its subsequent steps 3 and 4.

In step 3, the reshaping parameter of the reshaping process for converting the encoded reconstructed SDR picture to the HDR picture is selected.

The encoding device selects the reshaping parameter for the encoder reconstructed SDR picture from the sequence-layer reshaping parameter and the picture-layer reshaping parameter. One method is to compare the error between the HDR video obtained by reshaping the reconstructed SDR video by using the sequence-layer reshaping parameter and the original HDR video and the error between the HDR video obtained by reshaping the reconstructed SDR video by using the picture-layer reshaping parameter and the original HDR video, and select one of the sequence-layer reshaping parameter and the picture-layer reshaping parameter with lower error as the reshaping parameter for the reconstructed SDR picture. Here, the errors may be calculated by using the traditional average error criterion, such as an absolute error sum, or an existing error criterion for evaluating the quality of the HDR video in the standard organization test model and the reference model.

In step 4, the reshaping parameter is encoded and encoded bits are written into the picture-layer data unit and/or slice-layer data unit in the video bitstream.

The encoding device encodes the sequence-layer reshaping parameter, writes the encoded bits into the PPS, and for the entire HDR video encoding sequence, does not recalculate a new sequence-layer reshaping parameter and generate a PPS including the new reshaping parameter. When the reconstructed SDR picture uses the sequence-layer reshaping parameter, the picture-layer reshaping parameter is not encoded; otherwise, when the reconstructed SDR picture uses the picture-layer reshaping parameter, the picture-layer reshaping parameter is encoded, and the encoded bits are written into slice header included in this picture.

Alternatively, in the generated PPS, the encoding device may set a flag bit slice_segment_header_extension_present_flag for indicating the extended part of the slice header to 1. When the sequence-layer reshaping parameter is used, the encoding device may set a parameter indicating the number of bits of the extended part of the slice header to 0 in the slice header of the slice referencing the PPS. When the picture-layer parameter is used, the encoding device encodes the picture-layer reshaping parameter, calculates the number of bits required to encode the picture layer reshaping parameter, and sets the value thereof to the value of the number of bits of the extended part of the slice header, the encoding device will write the value into a bitstream of the extended part of the slice header, and then writes the encoded bits of the picture-layer reshaping parameter into a bitstream of the extended part of the slice header.

It should be further explained that the above flowchart of the encoding device is a possible implementation manner, and may be further optimized. For example, in order to reduce the computational complexity of the encoding device, the sequence-layer reshaping parameter may be calculated according to the inputted HDR video and the configured SDR video parameter before encoding, and the picture-layer reshaping parameter may be calculated only for key frame pictures in the step 302, while other frame pictures other than the key frame pictures may directly use the sequence-layer reshaping parameter. The picture which may be selected as a key frame includes a scene switching picture, a random access picture, and a picture with a smaller temporal identifier (ID) value in the encoded video sequence. On the other hand, in order to pursue the best quality of the reconstructed HDR video, the encoding device may select the picture-layer reshaping parameter for as many SDR pictures as possible, or select the picture-layer reshaping parameter for each SDR picture. When the encoding device is configured is such a mode that the picture-layer reshaping parameter is selected for each SDR picture, the sequence-layer reshaping parameter is not encoded in the PPS, and the picture-layer reshaping parameter is encoded in the extended part of the slice header of the picture. Further, in order to improve the quality of the reconstructed HDR video, the encoding device may separately calculate the picture-layer reshaping parameters for different slices in the same picture and encode them in the extended part of the slice header. The encoding device may set an encoding control parameter according to application requirements and available computing resources of the device itself, and perform the selection among the above reshaping parameter calculating and encoding methods. For example, for video storage and non-real-time streaming media applications, the encoding device is usually configured with sufficient computing resources, and may select an encoding mode in which each picture uses the picture-layer reshaping parameter. In a case of real-time video communications or limited computing resources of the encoding device, the picture-layer reshaping parameter may be used for key frame pictures and the sequence-layer reshaping parameter may be used for non-key frames.

By using the above encoding method, additional encoding overhead of other encoding control parameters in the repeatedly encoding PPS due to frequent generation of a new PPS to encode the reshaping parameter is avoided while the picture adaptability of the reshaping process is improved.

In an alternative embodiment, the process of determining the reshaping parameter used for reshaping the reconstructed picture according to the picture-layer reshaping parameter and the sequence-layer reshaping parameter includes: the reshaping parameter used for reshaping the reconstructed picture is determined from the picture-layer reshaping parameter, the sequence-layer reshaping parameter, and the reshaping parameter used by the preceding coded picture in a current encoding order. Alternatively, the process of determining the reshaping parameter used for reshaping the reconstructed picture from the picture-layer reshaping parameter, the sequence-layer reshaping parameter, and the reshaping parameter used by the preceding coded picture in a current encoding order includes: the reconstructed picture is reshaped by respectively using the picture-layer reshaping parameter, the sequence-layer reshaping parameter, and the reshaping parameter used by the preceding coded picture, and one of the picture-layer reshaping parameter, the sequence-layer reshaping parameter, and the reshaping parameter used by the preceding coded picture which minimizes the error between the HDR picture obtained by reshaping the reconstructed picture and the target HDR picture serves as the reshaping parameter used for reshaping the reconstructed picture.

In an alternative embodiment, the process of writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream are as follow. When the reshaping parameter used for reshaping the reconstructed picture is the sequence-layer reshaping parameter, the sequence-layer reshaping parameter is encoded, and encoded bits are written into the picture parameter set (PPS) and/or the parameter set referred to by the PPS of the video bitstream in which the bits of the current coding picture are included or of the to-be-processed video bitstream. When the reshaping parameter used for reshaping the reconstructed picture is the picture-layer reshaping parameter or the reshaping parameter used by the preceding coded picture, the picture-layer reshaping parameter or the reshaping parameter used by the preceding coded picture is encoded, and encoded bits are written into a parameter data unit included in the access unit (AU) in the video bitstream in which the bits of the current coding picture are included or into the picture-layer data unit and/or the slice-layer data unit of the to-be-processed video bitstream. When the reshaping parameter used for reshaping the reconstructed picture is the picture-layer reshaping parameter, the picture-layer reshaping parameter is encoded, and encoded bits are written into a parameter data unit included in the access unit (AU) in the video bitstream in which the bits of the current coding picture are included or into the picture-layer data unit and/or the slice-layer data unit of the to-be-processed video bitstream. When the reshaping parameter used for reshaping the reconstructed picture is the reshaping parameter used by the preceding coded picture, fourth identification information in the access unit (AU) in the video bitstream in which the bits of the current coding picture are included or into the picture-layer data unit and/or the slice-layer data unit of the to-be-processed video bitstream is encoded. The fourth identification information is used for indicating that the reshaping parameter is the reshaping parameter used by the preceding encoded picture, and the parameter data unit is a data unit included in the AU independently of a slice bitstream data unit. Alternatively, the method in the above embodiment further includes: identification information of indicating the reshaping parameter is encoded in at least one of the following manners: a manner of encoding first identification information used for indicating the reshaping parameter in a video parameter set (VPS), and a manner of encoding second identification information used for indicating the reshaping parameter in a sequence parameter set (SPS), which are described below in combination with alternative embodiments.

A Sixth Alternative Embodiment

The present embodiment provides an HDR video encoding method corresponding to the decoding method according to the second alternative embodiment, and an HDR video encoding device. The bitstream generated by the device may be correctly processed by the decoding apparatus in the second alternative embodiment. An input to the device in the present embodiment is an original HDR video, and an output of the device is an HDR video bitstream or a transport stream or media file including the HDR video bitstream. The present embodiment includes the following steps.

In step 1, this step is the same as the step 1 in the fifth alternative embodiment, which will be omitted herein.

In step 2, this step is the same as the step 2 in the fifth alternative embodiment, which will be omitted herein.

In Step 3, a reshaping parameter of a reshaping process of converting the encoded reconstructed SDR picture into an HDR picture is selected.

The encoding device may select the reshaping parameter used for reshaping the encoder reconstructed SDR picture from the sequence-layer reshaping parameter, the picture-layer reshaping parameter and the reshaping parameter used by the preceding encoded picture in the encoding order. One method is to compare errors between HDR videos obtained by reshaping the reconstructed SDR video by respective using candidate reshaping parameters and the original HDR video, and select one of the candidate reshaping parameters with a lower error as the reshaping parameter for reshaping the reconstructed SDR picture. Here, the errors may be calculated by using the traditional average error criterion, such as the absolute error sum; or the errors may also be calculated by using error criteria, which evaluate the quality of the HDR video, already available in the standardization organization test model and reference software.

In step 4, the reshaping parameter is encoded and the encoded bits are written into the picture-layer data unit and/or the slice-layer data unit in the video bitstream.

The encoding device encodes the sequence-layer reshaping parameter, and writes the encoded bits into the PPS. For the entire HDR video encoding sequence, the encoding device does not recalculate a new sequence-layer reshaping parameter and generate a PPS including the new reshaping parameter.

When the reconstructed SDR picture is reshaped using the sequence-layer reshaping parameter, the encoding device corresponding to the decoding device described in the second alternative embodiment does not encode another two sets of candidate reshaping parameters in the step 3. When the reconstructed SDR picture is reshaped without using the sequence layer reshaping parameter, the encoding device generates a parameter data unit, encodes the non-sequence-layer reshaping parameter used in the reshaping, writes the encoded bits into the parameter data unit, and writes the parameter data unit into the AU in which the encoded picture is located. Here, the parameter data unit is a data unit included in the AU independently of the slice bitstream data unit, for example, a SEI data unit, a user-defined data unit and the like.

Alternatively, when the encoding device reshapes the reconstructed SDR video by using the non-sequence-layer reshaping parameter, the encoding device corresponding to the decoding device in the second alternative embodiment may be configured in such a mode that the reshaping parameter of the encoded AU is directly used. Alternatively, if the encoding device uses the picture-layer reshaping parameter, the encoding device generates a parameter data unit, encodes—the picture layer reshaping parameter, writes the encoded bits into the parameter data unit, and writes the parameter data unit into the AU in which the encoded picture is located. When the encoding device reshapes a current reconstructed SDR picture by using the reshaping parameter used in reshaping the preceding AU in an encoding order, the encoding device does not generate a parameter data unit but encodes identification information (corresponding to the above fourth identification information) indicating "which set of candidate reshaping parameters is used" in the slice header for indicating whether the reshaping parameter in the PPS or the reshaping parameter used in reshaping the preceding AU in the encoding order is used when reshaping the reconstructed SDR video. Corresponding to the decoding device described in second alternative embodiment, a method for configuring the encoding device may be as follows: the encoding device adopts the above method by default; or, the encoding device encodes in the VPS and/or SPS identification information of indicating whether to use the above method or not (the identification information encoded in the VPS corresponds to the above first identification information, and the identification information encoded in the SPS corresponds to the above second identification information), for indicating whether the reshaping parameter included in the parameter data unit of the decoded AU is used.

It should be noted that an optimization method similar to the encoding apparatus in the fifth alternative embodiment may also be applied to the encoding apparatus described in this embodiment.

Compared with the encoding device described in the fifth alternative embodiment, the encoding device in the present embodiment encodes the reshaping parameter in the parameter data unit included in the AU, and reduces the encoding overhead of the reshaping parameter in the slice header in a case where the picture includes multiple slices (for example, in a case where the encoded bits of the slice adapt to the maximum transmission unit of the network).

In an alternative embodiment, the process of determining a reshaping parameter used for reshaping the reconstructed picture according to the picture-layer reshaping parameter and the sequence-layer reshaping parameter includes: the reshaping parameter used for reshaping the reconstructed picture is determined from the picture-layer reshaping parameter, the sequence-layer reshaping parameter as well as one or more first other reshaping parameters encoded in a picture-layer parameter set and/or a slice-layer parameter set other than the PPS in the slice head information included in the used AUs other than the AU corresponding to the reconstructed picture. Alternatively, the process of determining the reshaping parameter used for reshaping the reconstructed picture from the picture-layer reshaping parameter, the sequence-layer reshaping parameter, and the first other reshaping parameter includes: the reconstructed picture is reshaped by respectively using the picture-layer reshaping parameter, the sequence-layer reshaping parameter and the first other reshaping parameter, and one of the above three reshaping parameters which minimizes the error between the HDR picture obtained by reshaping the reconstructed picture and the target HDR picture serves as the reshaping parameter used for reshaping the reconstructed picture.

In an alternative embodiment, the process of writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream is as follow. When the reshaping parameter used for reshaping the reconstructed picture is the sequence-layer reshaping parameter, information of identifying that the picture-layer parameter set and/or the slice-layer parameter set other than the PPS is not used is encoded in the slice header. When the reshaping picture used for reshaping the reconstructed picture is the first other reshaping parameter, information of identifying that the picture-layer parameter set and/or the slice-layer parameter set other than the PPS is used is encoded in the slice header, and a parameter set identifier of the parameter set in which the first other reshaping parameter is located is encoded in the slice header. When the reshaping parameter used for reshaping the reconstructed picture is the picture-layer reshaping parameter, the picture-layer reshaping parameter is encoded and encoded bits are written into a newly created parameter set data unit that is configured with a parameter set identifier, information of identifying that picture-layer parameter set and/or the slice-layer parameter set other than the PPS is used is encoded in the slice header, and the above parameter set identifier is encoded in the slice header. The above process is described in combination with an alternative embodiment.

A Seventh Alternative Embodiment

The present embodiment provides an HDR video encoding method corresponding to the decoding method in the third alternative embodiment, and an HDR video encoding device. The bitstream generated by the encoding device may be correctly processed by the decoding device in the third alternative embodiment. An input to the encoding device in the present embodiment is an original HDR video, and an output of the encoding device is an HDR video bitstream or a transport stream or media file including the HDR video bitstream. The present embodiment includes the following steps.

In step 1, this step is the same as the step 1 in the sixth alternative embodiment, which will be omitted here.

In step 2, this step is the same as the step 2 in the sixth alternative embodiment, which will be omitted here.

In Step 3, a reshaping parameter of a reshaping process of converting the encoded reconstructed SDR picture into an HDR picture is selected.

The encoding device may select the reshaping parameter used for reshaping the encoder reconstructed SDR picture from the sequence-layer reshaping parameter, the picture-layer reshaping parameter, and one or more reshaping parameters (corresponding to the above first other reshaping parameters) which have been encoded by using the picture-layer parameter set/the slice-layer parameter set (which is the same as the above picture-layer/slice-layer parameter set) other than the PPS. One method is to compare errors between HDR videos obtained by reshaping the reconstructed SDR video by respective using candidate reshaping parameters and the original HDR video, and select one of the candidate reshaping parameters with lower error as the reshaping parameter for reshaping the reconstructed SDR picture. Here, the errors may be calculated by using the traditional average error criterion, such as the absolute error sum. Alternatively the errors may also be calculated by using error criteria, which evaluate the quality of the HDR video, already available in the standard organization test model and reference software.

In step 4, the reshaping parameter is encoded and the encoded bits are written into the picture-layer data unit and/or the slice-layer data unit in the video bitstream.

The encoding device encodes the sequence-layer reshaping parameter, writes the encoded bits into the PPS, and for the entire HDR video encoding sequence, the encoding device does not recalculate a new sequence-layer reshaping parameter and generate a PPS including the new reshaping parameter.

When the reconstructed SDR picture is reshaped by using the sequence-layer reshaping parameter or the reshaping parameter which has been encoded in the picture-layer parameter set/slice-layer parameter set other than the PPS, the encoding device corresponding to the decoding device described in the third alternative embodiment does not encode the picture-layer candidate reshaping parameter in the step 3; and otherwise, when the reconstructed SDR picture is reshaped by using the picture-layer reshaping parameter, the encoding device generates a new parameter set data unit and allocate a parameter set identifier for the new parameter set data unit, encodes the used picture-layer reshaping parameter, and writes the encoded bits into the parameter set data unit. In the above process, when the encoding device uses the sequence-layer reshaping parameter, the encoding device encodes identification information indicating "not using picture-layer parameter set/slice-layer parameter set other than the PSS" in the slice header; and otherwise, the encoding device encodes identification information indicating "using picture-layer parameter set/slice-layer parameter set other than the PPS" in the slice header, and then encodes the picture-layer identifier/slice-layer identifier in which the used reshaping parameter is located.

It should be noted that an optimization method similar to the encoding device in the fifth alternative embodiment may also be applied to the encoding device described in this embodiment.

Compared with the encoding device described in the sixth alternative embodiment, the encoding device in the present embodiment encodes the reshaping parameters in the parameter sets, and may relatively flexibly select the encoded reshaping parameters, thereby improving the information utilization rate, and reducing the additional encoding overhead. Meanwhile, by means of the characteristics of the parameter set, the encoding device selects an intra-AU transmission manner and an extra-AU transmission manner for the picture-layer parameter set/slice-layer parameter set other than the PPS, thereby improving the transmission reliability of the reshaping parameters while increasing the transmission efficiency. For example, a transmitting end in which the encoding device is located may adopt a manner of re-transmitting the parameter sets with identical contents to recovering the error according to the identifier of the lost parameter set when the received parameter set including the feedback by the receiving end of the decoding device is lost.

In an alternative embodiment, the process of determining the reshaping parameter used for reshaping the reconstructed picture according to the picture-layer reshaping parameter and the sequence-layer reshaping parameter includes: the reshaping parameter used for reshaping the reconstructed picture is determined from the picture-layer reshaping parameter, the sequence-layer reshaping parameter and one or more second other reshaping parameters encoded in a system layer of a transport stream or a media file. Alternatively, the process of determining the reshaping parameter used for reshaping the reconstructed picture from the picture-layer reshaping parameter, the sequence-layer reshaping parameter and the second other reshaping parameter includes: the reconstructed picture is reshaped by respectively using the picture-layer reshaping parameter, the sequence-layer reshaping parameter and the second other reshaping parameter, and one of the picture-layer reshaping parameter, the sequence-layer reshaping parameter and the second other reshaping parameter, which minimizes an error between the HDR picture obtained by reshaping the reconstructed picture and the target HDR picture, serves as the reshaping parameter used for reshaping the reconstructed picture.

In an alternative embodiment, the step of writing the determined reshaping parameter used for reshaping the reconstructed picture into the picture-layer data unit and/or slice-layer data unit of the video bitstream in which the bits of the current coding picture are included or into the picture-layer data unit and/or the slice-layer data unit of the to-be-processed video bitstream is as follow. When the reshaping parameter used for reshaping the reconstructed picture is the sequence-layer reshaping parameter, fifth identification information is encoded in a system layer. The fifth identification information is used for indicating that the reshaping parameter used for reshaping the reconstructed picture does not use the reshaping parameter which has been encoded in the system layer. When the reshaping parameter used for reshaping the reconstructed picture is the picture-layer reshaping parameter, the picture-layer reshaping parameter is encoded in the system layer. When the reshaping parameter used for reshaping the reconstructed picture is the second other reshaping parameter, the second other reshaping parameter is encoded in the system layer, or the sixth identification information is encoded in the system layer. The sixth identification information is used for indicating that the reshaping parameter used for reshaping the reconstructed picture uses the reshaping parameter which has been encoded in the system layer.

In an alternative embodiment, a reshaping parameter used for performing a secondary reshaping operation on the reconstructed picture and control information used for indicating an execution mode of the secondary reshaping operation are encoded in the system layer, which will be described below in combination with an alternative embodiment.

An Eight Alternative Embodiment

The present embodiment provides an HDR video encoding method corresponding to the decoding method in the fourth alternative embodiment, and an HDR video encoding device. A bitstream generated by the encoding device may be correctly processed by the decoding device in the fourth alternative embodiment. An input to the encoding device in the present embodiment is an original HDR video, and an output of the encoding device is an HDR video bitstream or a transport stream or media file including the HDR video bitstream. The present embodiment includes the following steps.

In step 1, this step is the same as the step 1 in the seventh alternative embodiment, which will not be repeated here.

In step 2, this step is the same as the step 2 in the seventh alternative embodiment, which will be repeated here.

In Step 3, a reshaping parameter of a reshaping process of converting the encoded reconstructed SDR picture into an HDR picture is selected.

The encoding device may select the reshaping parameter used for reshaping the encoder reconstructed SDR picture from the sequence-layer reshaping parameter, the picture-layer reshaping parameter and one or more reshaping parameters encoded in a system layer of a transport stream or media file. One method is to compare errors between HDR videos obtained by reshaping the reconstructed SDR video by respective using candidate reshaping parameters and the original HDR video, and select one of the candidate reshaping parameters with lower error as the reshaping parameter for reshaping the reconstructed SDR picture. Here, the errors may be calculated by using the traditional average error criterion, such as the absolute error sum, or the errors may also be calculated by using error criteria, which evaluate the quality of the HDR video, already available in the standard organization test model and reference software.

In step 4, the reshaping parameter is encoded and the encoded bits are written into the picture-layer data unit and/or the slice-layer data unit in the video bitstream.

The encoding device encodes the sequence-layer reshaping parameter, writes the encoded bits into the PPS, and for the entire HDR video encoding sequence, the encoding device does not recalculate a new sequence-layer reshaping parameter and generate a PPS including the new reshaping parameter.

Alternatively, when the reconstructed SDR picture is reshaped by using the sequence-layer reshaping parameter, the encoding device corresponding to the decoding device in the fourth alternative embodiment does not encode the picture-layer reshaping parameter in the system layer, but encodes, in the system layer, identification information (corresponding to the above fifth identification information) indicating that the current AU does not uses the reshaping parameter which has been encoded in the system layer. Alternatively, the encoding device may select a processing method of reshaping the reconstructed SDR picture for twice, and encodes, in a bitstream of the system layer, the reshaping parameter for performing the secondary reshaping operation on the picture reshaped by using the sequence-layer reshaping parameter. The encoding device encodes, in the system layer, control information for indicating an execution mode of the reshaping operation.

Alternatively, when the reconstructed SDR picture is reshaped without using the sequence-layer reshaping parameter, the encoding device corresponding to the decoding device in the fourth alternative embodiment encodes, in the system layer, the reshaping parameter used for reshaping the SDR picture. The encoded reshaping parameter may be a picture-layer reshaping parameter, or may be identification information (corresponding to the above sixth identification information) used for indicating using the reshaping parameter encoded in the system layer. Alternatively, the encoding device may select a processing method of reshaping the reconstructed SDR picture for two times, encodes, in the HDR video bitstream, the picture-layer reshaping parameter (for example, by using the method in the fifth alternative embodiment, the sixth alternative embodiment, or the seventh alternative embodiment), then further calculates a reshaping parameter for reshaping the picture obtained by reshaping the reconstructed SDR picture by using the picture-layer reshaping parameter or the reshaping parameter which has been encoded in the system layer, and encodes this reshaping parameter in the system layer. Meanwhile, the encoding device encodes, in the system layer, control information for indicating the execution mode of the reshaping operation.

It should be noted that an optimization method similar to the encoding device in the fifth alternative embodiment may also be applied to the encoding device described in this embodiment.

Compared with the encoding device in the seventh alternative embodiment, the encoding device in the present embodiment encodes the reshaping parameter in the transport stream or media file, and encodes the control information for indicating the execution mode of the reshaping operation. The encoding device can relatively flexibly reshape the SDR picture, and may relatively effectively utilize the reshaping parameter which has been encoded in the system layer. Meanwhile, the encoding device may select an operation mode of performing cascading reshaping operations on the reconstructed SDR picture, and encodes, in the system layer, the reshaping parameter for performing the "secondary reshaping operation" on the reconstructed SDR picture, thereby further improving the reshaping precision of the reconstructed SDR picture, and improving the quality of the reconstructed HDR video.

By means of the description of the above embodiments, those skilled in the art may clearly understand that the method according to the above embodiments may be implemented by means of software plus a necessary general hardware platform, and certainly, may be implemented by means of hardware, but in many cases, the former is a better implementation manner. Based on such an understanding, the technical solution in essence or a part thereof that contributes to the prior art of the present invention may be embodied in the form of a software product. The computer software product is stored in one storage medium (such as a ROM/RAM, a magnetic disk, an optical disc), which includes several instructions for enabling a terminal device (which may be a mobile phone, a computer, a server, or a network device, etc.) to perform the methods described in the various embodiments of the present invention.

In the present embodiment, there are further provided a picture decoding device and a picture encoding device. The devices are used for implementing the above embodiments and alternative implementations, which have already been described earlier, such that a repeated description is not necessary. As used below, the term "module" may implement a combination of software and/or hardware with a predetermined function. Although the devices described in the following embodiment are preferably implemented in software, implementation of hardware or a combination of software and hardware is also possible and conceived.

Figure 3:
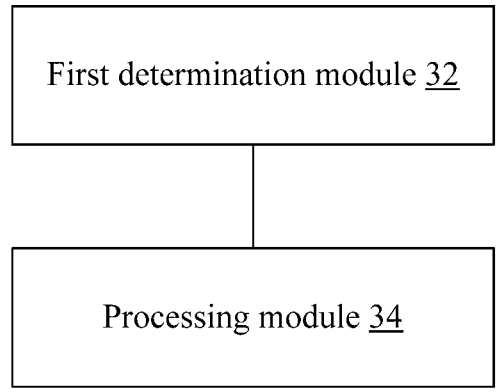
FIG. 3 is a block diagram showing a structure of a picture decoding apparatus according to an embodiment of the present disclosure.

FIG. 3 is a block diagram showing a structure of a picture decoding device according to an embodiment of the present disclosure. As shown in FIG. 3, the picture decoding device includes a first determination module 32 and a processing module 34. The picture decoding device will be described below.

The first determination module 32 is configured to parse a video bitstream to obtain a reshaping parameter from a picture-layer data unit and/or a slice-layer data unit of the video bitstream, and determine a reshaping parameter used for reshaping a reconstructed picture according to the obtained reshaping parameter. The processing module 34 is connected to the above first determination module 32 and configured to reshape the reconstructed picture by using the reshaping parameter used for reshaping the reconstructed picture. The reconstructed picture is a picture obtained by decoding the video bitstream before the reshaping is performed. The above picture-layer data unit and/or the slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

Figure 4:
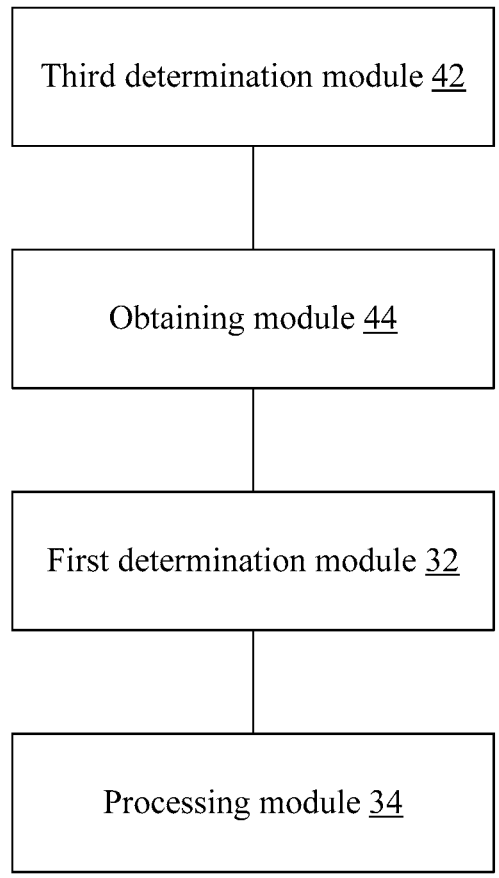
FIG. 4 is a block diagram showing an alternative structure of a picture decoding apparatus according to an embodiment of the present disclosure.

FIG. 4 is a block diagram showing an alternative structure of a picture decoding device according to an embodiment of the present disclosure. As shown in FIG. 4, the picture decoding device further includes a third determination module 42 and an obtaining module 44 in addition to all modules shown in FIG. 3. The picture decoding device will be described below.

The third determination module 42 is configured to: before obtaining the reshaping parameter from the picture-layer data unit and/or the slice-layer data unit of the video bitstream, and before determining the reshaping parameter used for reshaping a reconstructed picture according to the obtained reshaping parameter, determine a PPS identifier in the slice header included in the AU of the video bitstream. The obtaining module 44 is connected to the above third determination module 42 and the above first determination module 32, and is configured to obtain the reshaping parameter used for reshaping the reconstructed picture according to a PPS referred to by using the PPS identifier.

In an alternative embodiment, the obtaining module 44 may obtain the reshaping parameter used for reshaping the reconstructed picture according to the PPS referred to by using the PPS identifier by using the following manners. It is determined whether an extended part of the PPS and/or a parameter set referred to by the PPS carry or carries a first reshaping parameter. When the extended part of the PPS and/or the parameter set referred to by the PPS carry or carries the first reshaping parameter, it is determined that the obtained reshaping parameter used for reshaping the reconstructed picture is the first reshaping parameter; and/or, when the extended part of the PPS and/or the parameter set referred to by the PPS does not carry the first reshaping parameter, it is determined that the obtained reshaping parameter used for reshaping the reconstructed picture is a preset value or is null.

In an alternative embodiment, the above first determination module 32 may obtain the reshaping parameter from the picture-layer data unit and/or the slice-layer data unit of the video bitstream and determine the reshaping parameter used for reshaping the reconstructed picture according to the obtained reshaping parameter by using the following manners: parsing an extended portion of the slice header to obtain a second reshaping parameter; and updating or re-determining the reshaping parameter used for reshaping the reconstructed picture by using the second reshaping parameter.

In an alternative embodiment, the above first determination module 32 may further obtain the reshaping parameter from the picture-layer data unit and/or the slice-layer data unit of the video bitstream and determine the reshaping parameter used for reshaping the reconstructed picture according to the obtained reshaping parameter by using the following manners: parsing a parameter data unit included in the AU of the video bitstream to obtain a third reshaping parameter, updating or re-determining the reshaping parameter used for reshaping the reconstructed picture by using the third reshaping parameter; or determining that the reshaping parameter used for reshaping the reconstructed picture is the third reshaping parameter according to a pre-configured reshaping parameter determination manner. The parameter data unit is a data unit included in the AU independently of a slice bitstream data unit.

In an alternative embodiment, the reshaping parameter used for reshaping the reconstructed picture may be updated or re-determined by using the third reshaping parameter in the following manners: determining a PPS identifier in the slice header included in the AU of the video bitstream, and obtaining the reshaping parameter used for reshaping the reconstructed picture according to a PPS referred to by using the PPS identifier, and updating or re-determining the reshaping parameter used for reshaping the obtained reconstructed picture by using the third reshaping parameter.

In an alternative embodiment, the process of obtaining the reshaping parameter used for reshaping the reconstructed picture according to the PPS referred to by using the PPS identifier may be implemented in the following manners. It is determined whether an extended part of the PPS and/or a parameter set referred to by the PPS carry or carries the first reshaping parameter. When the extended part of the PPS and/or the parameter set referred to by the PPS carry or carries the first reshaping parameter, the obtained reshaping parameter used for reshaping the reconstructed picture is the first reshaping parameter; and/or, when the extended part of the PPS and/or a parameter set referred to by the PPS does not carry the first reshaping parameter, the obtained reshaping parameter used for reshaping the reconstructed picture is a preset value or is null.

In an alternative embodiment, the third reshaping parameter includes a fourth reshaping parameter obtained by parsing a parameter data unit included in a preceding AU of the AU.

In an alternative embodiment, the pre-configured reshaping parameter determination manner includes at least one of the following: a default determination manner, a determination manner of using first identification information obtained by parsing a video parameter set (VPS) to indicate the reshaping parameter, and a determination manner of using second identification information obtained by parsing a sequence parameter set (SPS) to indicate the reshaping parameter.

In an alternative embodiment, the above first determination module 32 may obtain the reshaping parameter from the picture-layer data unit and/or the slice-layer data unit of the video bitstream and determine the reshaping parameter used for reshaping the reconstructed picture according to the obtained reshaping parameter in the following manners. The slice header included in the AU is parsed to obtain third identification information used for indicating whether the reshaping parameter used for reshaping the reconstructed picture is determined according to a picture-layer parameter set and/or a slice layer parameter set other than the PPS. When the third identification information indicates that the reshaping parameter used for reshaping the reconstructed picture is determined according to the picture-layer parameter set and/or the slice-layer parameter set other than the PPS, the slice header included in the AU is parsed to obtain an identifier of the picture-layer parameter set and/or the slice-layer parameter set other than the PPS, a parameter set whose identifier is the same as the identifier of the picture-layer parameter set and/or the slice-layer parameter set other than the PPS is activated to obtain a fifth reshaping parameter, and the obtained reshaping parameter used for reshaping the reconstructed picture is updated or re-determined by using the fifth reshaping parameter.

In an alternative embodiment, the above first determination module 32 may further parse the video bitstream to obtain the reshaping parameter from the picture-layer data unit and/or the slice-layer data unit of the video bitstream and determine the reshaping parameter used for reshaping the reconstructed picture according to the obtained reshaping parameter in the following manner: obtaining a sixth reshaping parameter from a system-layer picture parameter data unit in a transport stream or a media file for carrying the video bitstream; updating or re-determining the reshaping parameter used for reshaping the reconstructed picture by using the sixth reshaping parameter; or determining that the reshaping parameter used for reshaping the reconstructed picture is the sixth reshaping parameter. The system-layer picture parameter data unit includes description information or auxiliary information corresponding to the access unit (AU) in the video bitstream.

In an alternative embodiment, the process of updating or re-determining the reshaping parameter used for reshaping the reconstructed picture by using the sixth reshaping parameter includes: a PPS identifier in the slice header included in the AU of the video bitstream is determined, the reshaping parameter used for reshaping the reconstructed picture is obtained according to a PPS referred to by using the PPS identifier; and the reshaping parameter used for reshaping the reconstructed picture is updated or re-determined by using the sixth reshaping parameter.

In an alternative embodiment, the process of obtaining the reshaping parameter used for reshaping the reconstructed picture according to the PPS referred to by using the PPS identifier includes: determining whether an extended part of the PPS and/or a parameter set referred to by the PPS carry or carries a first reshaping parameter; when the extended part of the PPS and/or the parameter set referred to by the PPS carry or carries the first reshaping parameter, determining that the obtained reshaping parameter used for reshaping the reconstructed picture is the first reshaping parameter; and/or, when the extended part of the PPS and/or the parameter set referred to by the PPS does not carry the first reshaping parameter, determining that the obtained reshaping parameter used for reshaping the reconstructed picture is a preset value or is null.

In an alternative embodiment, the reshaping parameter may be obtained from a system layer picture parameter data unit in a transport stream or a media file for carrying the video bitstream in the following manner: determining the reshaping parameter according to at least one of the following parameters obtained from the system layer picture parameter data unit: an identification parameter indicating whether to perform a reshaping operation or not, a reshaping parameter of the dynamic range, a reshaping parameter of the color gamut, and a use range of the reshaping parameter.

In an alternative embodiment, the above picture decoding device may further include a secondary reshaping parameter obtaining module and a secondary reshaping module. Connection relationships between the secondary reshaping parameter obtaining module and the secondary reshaping module and modules in the above picture decoding device may not be limited, that is, a sequential order of actions performed in the secondary reshaping parameter obtaining module and the secondary reshaping module and actions performed in the modules included in the above picture decoding device may not be limited. The secondary reshaping parameter obtaining module and the secondary reshaping module will be described below.

The secondary reshaping parameter obtaining module is configured to obtain a reshaping parameter for performing a secondary reshaping process on the reconstructed picture from a system-layer picture parameter data unit (or from another system layer information unit) in a transport stream or a media file for carrying the video bitstream. The system layer picture parameter data unit includes description information or auxiliary information corresponding to the access unit (AU) in the video bitstream. The secondary reshaping module is connected to the above secondary reshaping parameter obtaining module and configured to perform the secondary reshaping process on the reconstructed picture by using the obtained reshaping parameter for performing the secondary reshaping process on the reconstructed picture.

In an alternative embodiment, the above secondary reshaping parameter obtaining module may obtain the reshaping parameter for performing the secondary reshaping process on the reconstructed picture from the system-layer picture parameter data unit in a transport stream or a media file that carries the video bitstream in the following manner: determining the reshaping parameter for performing the secondary reshaping process on the reconstructed picture according to at least one of the following parameters obtained from the system-layer picture parameter data unit: an identification parameter indicating whether to perform the reshaping operation, a reshaping parameter of the dynamic range, a reshaping parameter of the color gamut, and a use range of the reshaping parameter.

Figure 5:
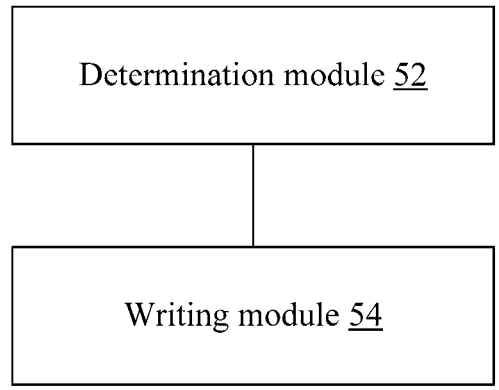
FIG. 5 is a block diagram showing a structure of a picture encoding apparatus according to an embodiment of the present disclosure.

FIG. 5 is a block diagram showing a structure of a picture encoding device according to an embodiment of the present disclosure. As shown in FIG. 5, the picture encoding device includes a determination module 52 and a writing module 54. The picture encoding device will be described below.

The determination module 52 is configured to determine a reshaping parameter used by a reconstructed picture for converting the reconstructed picture into a high dynamic range (HDR) video picture. The reconstructed picture is a standard dynamic range (SDR) picture obtained by locally reconstructing a current coding picture by an encoder before the encoder performs reshaping, or the reconstructed picture is the SDR picture obtained by decoding a to-be-processed video bitstream. The writing module 54 is connected to the above determination module 52 and configured to write the determined reshaping parameter used by the reconstructed picture into the picture-layer data unit and/or the slice-layer data unit of the video bitstream in which the bits of the current coding picture are included or into the picture-layer data unit and/or the slice-layer data unit of the to-be-processed video bitstream. The above picture-layer data unit and/or the slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

In an alternative embodiment, the above determination module 52 may determine the reshaping parameter used by a reconstructed picture for converting the reconstructed picture into a high dynamic range (HDR) video picture in the following manner: determining a picture-layer reshaping parameter and a sequence-layer reshaping parameter, and determining the reshaping parameter used by the reconstructed picture for converting the reconstructed picture into an HDR video picture according to the picture-layer reshaping parameter and the sequence-layer reshaping parameter. The picture-layer reshaping parameter includes a filter coefficient used in a reshaping process of minimizing an error between the reconstructed picture and a target HDR picture. The sequence-layer reshaping parameter includes a dynamic range and a color gamut of the target HDR video constituted by the target HDR picture, a dynamic range and a color gamut of a reconstructed video constituted by the reconstructed picture, a determined mapping parameter that extends from the dynamic range of the reconstructed video to the dynamic range of the target HDR video, and/or a conversion parameter from the color gamut of the reconstructed video to the color gamut of the target HDR video.

In an alternative embodiment, the target HDR picture is an HDR picture corresponding to the reconstructed picture in an original HDR video inputted into an encoder.

In an alternative embodiment, the process of determining the reshaping parameter used for reshaping the reconstructed picture according to the picture-layer reshaping parameter and the sequence-layer reshaping parameter may be implemented in the following manner. The reconstructed picture is reshaped by respectively using the picture-layer reshaping parameter and the sequence-layer reshaping parameter. One of the picture-layer reshaping parameter and the sequence-layer reshaping parameter which minimizes an error between the HDR picture obtained by reshaping the reconstructed picture and the target HDR picture is determined to serve as the reshaping parameter used for reshaping the reconstructed picture.

In an alternative embodiment, the above writing module 54 may write the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream in the following manners: when the reshaping parameter used for reshaping the reconstructed picture is the sequence-layer reshaping parameter, the sequence-layer reshaping parameter is encoded, and encoded bits are written into the picture parameter set (PPS) and/or the parameter set referred to by the PPS of the video bitstream in which the bits of the current coding picture are included or into the picture-layer data unit and/or the slice-layer data unit of the to-be-processed video bitstream; when the reshaping parameter used for reshaping the reconstructed picture is the picture-layer reshaping parameter, the picture-layer reshaping parameter is encoded, and encoded bits are written into the slice header included in the access unit (AU) of the video bitstream in which the bits of the current coding picture are included or into the picture-layer data unit and/or the slice-layer data unit of the to-be-processed video bitstream.

In an alternative embodiment, the process of determining the reshaping parameter used for reshaping the reconstructed picture according to the picture-layer reshaping parameter and the sequence-layer reshaping parameter may be implemented in the following manner. The reshaping parameter used for reshaping the reconstructed picture is determined from the picture-layer reshaping parameter, the sequence-layer reshaping parameter, and a reshaping parameter used in reshaping a preceding coded picture in a current encoding order.

In an alternative embodiment, the reshaping parameter used for reshaping the reconstructed picture may be determined from the picture-layer reshaping parameter, the sequence-layer reshaping parameter, and the reshaping parameter used in reshaping the preceding coded picture in the encoding order in the following manners: reshaping the reconstructed picture by respectively using the picture-layer reshaping parameter, the sequence-layer reshaping parameter, and the reshaping parameter used for reshaping the preceding coded picture, and determining that one of the picture-layer reshaping parameter, the sequence-layer reshaping parameter, and the reshaping parameter used for reshaping the preceding coded picture which minimizes the error between the HDR picture obtained by reshaping the reconstructed picture and the target HDR picture serves as the reshaping parameter used for reshaping the reconstructed picture.

In an alternative embodiment, the above writing module 54 may write the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream in the following manners. When the reshaping parameter used for reshaping the reconstructed picture is the sequence-layer reshaping parameter, the sequence-layer reshaping parameter is coded, and encoded bits are written into the picture parameter set (PPS) and/or the parameter set referred to by the PPS of the video bitstream in which the bits of the current coding picture are included or into the picture-layer data unit and/or the slice-layer data unit of the to-be-processed video bitstream. When the reshaping parameter used for reshaping the reconstructed picture is the picture-layer reshaping parameter or the reshaping parameter used in reshaping the preceding coded picture, the picture-layer reshaping parameter or the reshaping parameter used in reshaping the preceding coded picture is coded, and encoded bits are written into a parameter data unit included in the access unit (AU) of the video bitstream in which the bits of the current coding picture are included or into the picture-layer data unit and/or the slice-layer data unit of the to-be-processed video bitstream. When the reshaping parameter used for reshaping the reconstructed picture is the picture-layer reshaping parameter, the picture layer reshaping parameter is encoded, and encoded bits are written into a parameter data unit included in the access unit (AU) of the video bitstream in which the bits of the current coding picture are included or into the picture-layer data unit and/or the slice-layer data unit of the to-be-processed video bitstream. When the reshaping parameter used for reshaping the reconstructed picture is the reshaping parameter used in reshaping the preceding coded picture, fourth identification information in the access unit (AU) of the video bitstream in which the bits of the current coding picture are included or into the picture-layer data unit and/or the slice-layer data unit of the to-be-processed video bitstream is coded. The fourth identification information is used for indicating that the reshaping parameter is the reshaping parameter used in reshaping the preceding encoded picture. The parameter data unit is a data unit included in the AU independently of a slice bitstream data unit.

In an alternative embodiment, the above picture encoding device may include an encoding module in additional to the above modules. A connection manner of the encoding module and the above modules in the picture encoding device may not be limited, that is, a sequential order of actions performed in the encoding module and actions performed in the above modules in the picture encoding device may not be limited. The encoding module will be described below.

The encoding module is configured to encode identification information indicating the reshaping parameter in at least one of the following manners: a manner of encoding first identification information used for indicating the reshaping parameter in a video parameter set (VPS), and a manner of encoding second identification information used for indicating the reshaping parameter in a sequence parameter set (SPS).

In an alternative embodiment, the reshaping parameter used for reshaping the reconstructed picture may be determined according to the picture-layer reshaping parameter and the sequence-layer reshaping parameter in the following manner: determining the reshaping parameter used for reshaping the reconstructed picture from the picture-layer reshaping parameter, the—sequence layer reshaping parameter as well as one or more first other reshaping parameters a used picture-layer parameter set and/or a used slice-layer parameter set other than the PPS in the slice header comprised in the AU corresponding to the reconstructed picture.

In an alternative embodiment, the reshaping parameter used for reshaping the reconstructed picture may be determined from the picture-layer reshaping parameter, the sequence-layer reshaping parameter, and the first other reshaping parameter in the following manners: reshaping the reconstructed picture by respectively using the picture-layer reshaping parameter, the sequence-layer reshaping parameter and the first other reshaping parameter; and determining that one of the picture-layer reshaping parameter, the sequence-layer reshaping parameter and the first other reshaping parameter which minimizes an error between an HDR picture obtained by reshaping the reconstructed picture and the target HDR picture serves as the reshaping parameter used for reshaping the reconstructed picture.

In an alternative embodiment, the above writing module 54 may write the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream in the following manners. When the reshaping parameter used for reshaping the reconstructed picture is the sequence-layer reshaping parameter, information of indicating that the picture-layer parameter set and/or the slice layer parameter set other than the PPS is not used is encoded in the slice header. When the reshaping picture used for reshaping the reconstructed picture is the first other reshaping parameter, information of indicating that the picture-layer parameter set and/or the slice-layer parameter set other than the PPS is used in the slice header and a parameter set identifier of the parameter set in which the first other reshaping parameter is located is encoded in the slice header. When the reshaping parameter used for reshaping the reconstructed picture is the picture-layer reshaping parameter, the picture-layer reshaping parameter is encoded and encoded bits are written into a newly created parameter set data unit configured with a parameter set identifier; information of indicating that the picture-layer parameter set and/or the slice-layer parameter set other than the PPS is used is encoded in the slice header, and the parameter set identifier is also encoded in the slice header.

In an alternative embodiment, the reshaping parameter used for reshaping the reconstructed picture may be determined according to the picture-layer reshaping parameter and the sequence-layer reshaping parameter in the following manner: determining the reshaping parameter used for reshaping the reconstructed picture from the picture-layer reshaping parameter, the sequence-layer reshaping parameter and one or more second other reshaping parameters encoded in a system layer of a transport stream or a media file.

In an alternative embodiment, the process of determining the reshaping parameter used for reshaping the reconstructed picture from the picture-layer reshaping parameter, the sequence-layer reshaping parameter and the second other reshaping parameter may be implemented in the following manners. The reconstructed picture is reshaped by respectively using the picture-layer reshaping parameter, the sequence-layer reshaping parameter and the second other reshaping parameter, and one of the picture-layer reshaping parameter, the sequence-layer reshaping parameter and the second other reshaping parameter that minimizes an error between the HDR picture obtained by reshaping the reconstructed picture and the target HDR picture is determined as the reshaping parameter used for reshaping the reconstructed picture.

In an alternative embodiment, the above writing module 54 may write the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream in the following manners. When the reshaping parameter used for reshaping the reconstructed picture is the sequence-layer reshaping parameter, fifth identification information is encoded in a system layer, and the fifth identification information is used for indicating that the reshaping parameter used for reshaping the reconstructed picture does not use the reshaping parameter which has been encoded in the system layer. When the reshaping parameter used for reshaping the reconstructed picture is the picture-layer reshaping parameter, the picture-layer reshaping parameter is encoded in the system layer. When the reshaping parameter used for reshaping the reconstructed picture is the second other reshaping parameter, the second other reshaping parameter is encoded in the system layer, or the sixth identification information is encoded in the system layer. The sixth identification information is used for indicating that the reshaping parameter used for reshaping the reconstructed picture uses the reshaping parameter which has been encoded in the system layer.

In an alternative embodiment, a reshaping parameter used for performing a secondary reshaping operation on the reconstructed picture and control information used for indicating an execution mode of the secondary reshaping operation are encoded in the system layer.

Figure 6:
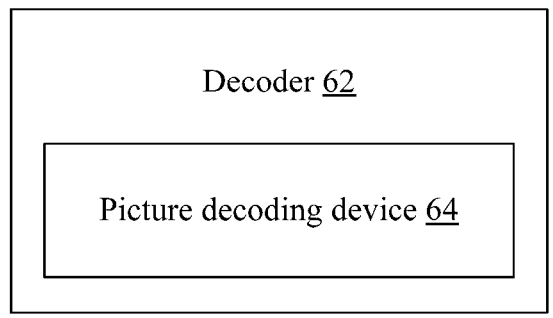
FIG. 6 is a block diagram showing a structure of a decoder according to an embodiment of the present disclosure.

FIG. 6 is a block diagram showing a structure of a decoder according to an embodiment of the present disclosure. As shown in FIG. 6, the decoder 62 includes the picture decoding device 64 in any one of the above embodiments.

Figure 7:
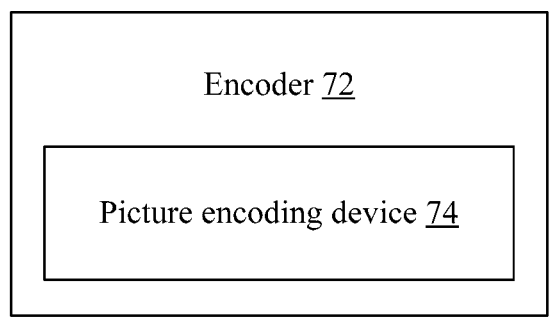
FIG. 7 is a block diagram showing a structure of an encoder according to an embodiment of the present disclosure.

FIG. 7 is a block diagram showing a structure of an encoder according to an embodiment of the present disclosure. As shown in FIG. 7, the encoder 72 includes the picture encoding device 74 according to any one of the above embodiments.

An embodiment of the present disclosure further provides an electronic device, which includes a decoding device (for example, the above decoder 62) and/or an encoding device (for example, the above encoder 72).

The above decoding device may implement, for example, the method of the decoding device of any one of the foregoing alternative embodiment 1, the foregoing alternative embodiment 2, the foregoing alternative embodiment 3, and the foregoing alternative embodiment 4 to process an HDR video bitstream or to process a transport stream or media file that includes the HDR video bitstream, for generating a reconstructed HDR video suitable for playback.

The above encoding device may be implemented, for example, based on the encoding device of any one of the foregoing corresponding alliterative embodiment 5, the foregoing corresponding alternative embodiment 6, the foregoing corresponding alternative embodiment 7, and the foregoing corresponding alternative embodiment 8 to process an HDR video (i.e., the inputted original HDR video) for generating an HDR video bitstream, or a transport stream or media file including the HDR video bitstream.

The electronic device in this embodiment may be a related bitstream generating device and a related bitstream receiving and playing device in a video communication application, for example, a mobile phone, a computer, a server, a set-top box, a portable mobile terminal, a digital video camera, a television broadcasting system device, and the like.

It should be noted that the above modules may be implemented by software or hardware. For the latter, it may be implemented in the following manner, but it is not limited to this: the above modules are all located in the same processor; or the above modules are respectively located in multiple processors.

An embodiment of the present disclosure further provides a storage medium. Alternatively, in the present embodiment, the above storage medium may be configured to store program codes for performing the following steps.

In step S11, a video bitstream is parsed to obtain a reshaping parameter from a picture-layer data unit and/or a slice-layer data unit of the video bitstream, and a reshaping parameter used for reshaping a reconstructed picture is determined according to the obtained reshaping parameter.

In step S12, the reconstructed picture is reshaped by using the reshaping parameter used for reshaping the reconstructed picture. The reconstructed picture is a picture obtained by decoding the video bitstream before the reshaping is performed. The above picture-layer data unit and/or slice-layer data unit includes at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit.

In an alternative embodiment, the storage medium is further configured to store program codes for performing the following steps.

In step S21, a reshaping parameter used for reshaping a reconstructed picture so as to convert the reconstructed picture into a high dynamic range (HDR) video picture is determined. The reconstructed picture is a standard dynamic range (SDR) picture obtained by locally reconstructing a current coding picture by an encoder before the encoder performs reshaping, or the reconstructed picture is an SDR picture obtained by decoding a to-be-processed video bitstream.

In step S22, the determined reshaping parameter used for reshaping the reconstructed picture is written into the picture-layer data unit and/or the slice-layer data unit of the video bitstream in which the bits of the current coding picture are included or into the picture-layer data unit and/or the slice-layer data unit of the to-be-processed video bitstream. The above picture-layer data unit and/or the slice-layer data unit includes at least one of the following data units: a picture-level parameter set and/or a slice-layer parameter set different from a picture parameter set (PPS), as well as a system-layer picture parameter data unit, slice header, and a parameter data unit, which are included in an access unit (AU) corresponding to the reconstructed picture.

Alternatively, in this embodiment, the storage medium may include but is not limited to various mediums such as a U disk, a read-only memory (ROM), and a random access memory (RAM), a removable hard disk, a disk, or an optical disc that may store a program code.

Alternatively, in this embodiment, the processor performs the steps in the foregoing method embodiments according to the stored program codes in the storage medium.

In an alternative embodiment, for specific examples in this embodiment, reference may be made to examples described in the foregoing embodiments and alternative embodiments, which will not described herein again in this embodiment.

Obviously, those skilled in the art should understand that modules or steps of the present disclosure described above may be implemented by a general-purpose computing apparatus, which may be concentrated on a single computing apparatus or distributed over a network constituted by multiple computing apparatuses. Alternatively, they may be implemented with program codes that are executable by the computing apparatus, so that they may be stored in a storage apparatus by the computing apparatus and, in some cases, illustrated or described steps may be performed in a different order than that herein, or they may be separately fabricated into individual integrated circuit modules, or multiple of them may be implemented as a single integrated circuit module. In this way, the present disclosure is not limited to any specific combination of hardware and software.

The foregoing descriptions are merely alternative embodiments of the present disclosure and are not intended to limit the present disclosure. For those skilled in the art, the present disclosure may have various changes and modifications. Any modifications, equivalent substitutions, and improvements made within the spirit and principle of the present disclosure shall fall within a protective scope of the present disclosure.

INDUSTRIAL APPLICABILITY

From the above description, it can be known that the reshaping parameter used for reshaping the reconstructed picture according to the present disclosure is determined according to the reshaping parameter obtained from a picture-layer data unit and/or a slice-layer data unit of a video bitstream. Therefore, the viewing quality of the picture may be effectively improved and the viewing quality of a video may be further improved, and the encoding overhead of the reshaping parameter may be reduced. By means of the above steps, the problems of poor viewing quality of the video and high encoding overhead of the reshaping parameter in the related art are solved, and further achieved are the effects of improving the viewing quality of the video and reducing the encoding overhead of the reshaping parameter.

What is claimed is:

1. A picture decoding method, comprising:
    parsing a video bitstream to obtain a reshaping parameter from a picture-layer data unit and/or a slice-layer data unit of the video bitstream, and determining a reshaping parameter used for reshaping a reconstructed picture according to the obtained reshaping parameter; and
    reshaping the reconstructed picture by using the reshaping parameter used for reshaping the reconstructed picture;
    wherein the reconstructed picture is a picture obtained by decoding the video bitstream before performing the reshaping; the picture-level data unit and/or the slice-layer data unit comprises at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit;
    wherein before obtaining a reshaping parameter from a picture-layer data unit and/or a slice-layer data unit of the video bitstream, and determining a reshaping parameter used for reshaping a reconstructed picture according to the obtained reshaping parameter, the method further comprises:
        determining a PPS identifier in the slice header included in the AU of the video bitstream; and obtaining the reshaping parameter used for reshaping the reconstructed picture according to the PPS referred to by using the PPS identifier,
wherein the obtaining the reshaping parameter used for reshaping the reconstructed picture according to the PPS referred to by using the PPS identifier comprises:
determining whether an extended part of the PPS and/or a parameter set referred to by the PPS carries a first reshaping parameter;
when it is determined that the extended part of the PPS and/or the parameter set referred to by the PPS carries the first reshaping parameter, determining that the obtained reshaping parameter used for reshaping the reconstructed picture is the first reshaping parameter, and/or, when it is determined that the extended part of the PPS and/or the parameter set referred to by the PPS does not carry the first reshaping parameter, determining that the obtained reshaping parameter used for reshaping the reconstructed picture is a preset value or is null.

2. The method according to claim 1, wherein the obtaining a reshaping parameter from a picture-layer data unit and/or a slice-layer data unit of the video bitstream and determining a reshaping parameter used for reshaping a reconstructed picture according to the obtained reshaping parameter comprises:
parsing an extended portion of the slice header to obtain a second reshaping parameter; and
updating or re-determining the reshaping parameter used for reshaping the reconstructed picture by using the second reshaping parameter.

3. The method according to claim 1, wherein the obtaining a reshaping parameter from a picture-layer data unit and/or a slice-layer data unit of the video bitstream and determining a reshaping parameter used for reshaping a reconstructed picture according to the obtained reshaping parameter comprises:
parsing a parameter data unit included in the AU of the video bitstream to obtain a third reshaping parameter, wherein the parameter data unit is a data unit included in the AU and independent from a slice bitstream data unit; and
updating or re-determining the reshaping parameter used for reshaping the reconstructed picture by using the third reshaping parameter; or
determining that the reshaping parameter used for reshaping the reconstructed picture is the third reshaping parameter according to a pre-configured reshaping parameter determination manner,
the pre-configured reshaping parameter determination manner comprises at least one of the following:
a default determination manner,
a determination manner of using first identification information obtained by parsing a video parameter set (VPS) to indicate the reshaping parameter, and
a determination manner of using second identification information obtained by parsing a sequence parameter set (SPS) to indicate the reshaping parameter.

4. The method according to claim 3, wherein the updating or re-determining the reshaping parameter used for reshaping the reconstructed picture by using the third reshaping parameter comprises:
determining a PPS identifier in the slice header included in the AU of the video bitstream;
obtaining the reshaping parameter used for reshaping the reconstructed picture according to a PPS referred to by using the PPS identifier; and
updating or re-determining the obtained reshaping parameter used for reshaping the reconstructed picture by using the third reshaping parameter,
wherein the obtaining the reshaping parameter used for reshaping the reconstructed picture according to the PPS referred to by using the PPS identifier comprises:
determining whether an extended part of the PPS and/or a parameter set referred to by the PPS carries a first reshaping parameter;
when it is determined that the extended part of the PPS and/or the parameter set referred to by the PPS carries the first reshaping parameter, determining that the obtained reshaping parameter used for reshaping the reconstructed picture is the first reshaping parameter; and/or, when it is determined that the extended part of the PPS and/or the parameter set referred to by the PPS does not carry the first reshaping parameter, determining that the obtained reshaping parameter used for reshaping the reconstructed picture is a preset value or is null.

5. The method according to claim 1, wherein the obtaining a reshaping parameter from a picture-layer data unit and/or a slice-layer data unit of the video bitstream and determining a reshaping parameter used for reshaping a reconstructed picture according to the obtained reshaping parameter comprises:
parsing the slice header included in the AU to obtain third identification information, wherein the third identification information is used for indicating whether the reshaping parameter used for reshaping the reconstructed picture is determined according to a picture-layer parameter set and/or a slice-layer parameter set other than the PPS;
when the third identification information indicates that the reshaping parameter used for reshaping the reconstructed picture is determined according to a picture-layer parameter set and/or a slice-layer parameter set other than the PPS, parsing the slice header included in the AU to obtain an identifier of the picture-layer parameter set and/or the slice-layer parameter set other than the PPS;
activating a parameter set whose identifier is the same as the identifier of the picture-layer parameter set and/or the slice-layer parameter set other than the PPS to obtain a fifth reshaping parameter; and
updating or re-determining the obtained reshaping parameter used for reshaping the reconstructed picture by using the fifth reshaping parameter.

6. The method according to claim 1, wherein the parsing a video bitstream to obtain a reshaping parameter from a picture-layer data unit and/or a slice-layer data unit of the video bitstream and determining a reshaping parameter used for reshaping a reconstructed picture according to the obtained reshaping parameter comprises:
obtaining a sixth reshaping parameter from a system-layer picture parameter data unit in a transport stream or a media file for carrying the video bitstream; and
updating or re-determining the reshaping parameter used for reshaping the reconstructed picture by using the sixth reshaping parameter; or determining that the reshaping parameter used for reshaping the reconstructed picture is the sixth reshaping parameter;

wherein the system-layer picture parameter data unit comprises description information or auxiliary information corresponding to the AU of the video bitstream, wherein the obtaining a sixth reshaping parameter from a system-layer picture parameter data unit in a transport stream or a media file for carrying the video bitstream comprises: determining the reshaping parameter according to at least one of the following parameters obtained from the system-layer picture parameter data unit: an identification parameter indicating whether to perform a reshaping operation, a dynamic range reshaping parameter, a color gamut reshaping parameter, and a use range of the reshaping parameter.

7. The method according to claim 6, wherein the updating or re-determining the reshaping parameter used for reshaping the reconstructed picture by using the sixth reshaping parameter comprises:

determining a PPS identifier in the slice header included in the AU of the video bitstream;

obtaining the reshaping parameter used for reshaping the reconstructed picture according to the PPS referred to by using the PPS identifier; and updating or re-determining the reshaping parameter used for reshaping the reconstructed picture by using the sixth reshaping parameter, wherein the obtaining the reshaping parameter used for reshaping the reconstructed picture according to the PPS referred to by using the PPS identifier comprises:

determining whether an extended part of the PPS and/or a parameter set referred to by the PPS carries a first reshaping parameter;

when it is determined that the extended part of the PPS and/or the parameter set referred to by the PPS carries the first reshaping parameter, determining that the obtained reshaping parameter used for reshaping the reconstructed picture is the first reshaping parameter; and/or, when it is determined that the extended part of the PPS and/or the parameter set referred to by the PPS does not carry the first reshaping parameter, determining that the obtained reshaping parameter used for reshaping the reconstructed picture is a preset value or is null.

8. The method according to claim 1, further comprising:

obtaining a reshaping parameter for performing a secondary reshaping on the reconstructed picture from a system-layer picture parameter data unit in a transport stream or a media file for carrying the video bitstream, wherein the system-layer picture parameter data unit comprises description information or auxiliary information corresponding to the AU of the video bitstream; and performing the secondary reshaping on the reconstructed picture by using the obtained reshaping parameter for performing the secondary reshaping on the reconstructed picture, wherein the obtaining a reshaping parameter for performing a secondary reshaping on the reconstructed picture from a system-layer picture parameter data unit in a transport stream or a media file for carrying the video bitstream comprises: determining the reshaping parameter for performing the secondary reshaping on the reconstructed picture according to at least one of the following parameters obtained from the system-layer picture parameter data unit: an identification parameter indicating whether to perform reshaping, a dynamic range reshaping parameter, a color gamut reshaping parameter, and a use range of the reshaping parameter.

9. A picture encoding method, comprising:

determining a reshaping parameter used for reshaping a reconstructed picture for converting the reconstructed picture into a high dynamic range (HDR) video picture, wherein the reconstructed picture is a standard dynamic range (SDR) picture obtained by locally reconstructing a current coding picture by an encoder before the encoder performs reshaping, or the reconstructed picture is an SDR picture obtained by decoding a to-be-processed video bitstream; and writing the determined reshaping parameter used for reshaping the reconstructed picture into a video bitstream in which the bits of the current coding picture are included or into a picture-level data unit and/or a slice-layer data unit of the to-be-processed video bitstream, wherein the picture-level data unit and/or the slice-layer data unit comprises at least one of the following data units: a picture-layer parameter set and/or a slice-layer parameter set different from a picture parameter set (PPS), a parameter data unit which are included in an access unit (AU) corresponding to the reconstructed picture, slice header and a system-layer picture parameter data unit;

wherein the determining a reshaping parameter used for reshaping a reconstructed picture for converting the reconstructed picture into an HDR video picture comprises:

determining a picture-layer reshaping parameter and a sequence-layer reshaping parameter, wherein the picture-layer reshaping parameter comprises a filter coefficient used in a reshaping process of minimizing an error between the reconstructed picture and the target HDR picture; and wherein the sequence-layer reshaping parameter comprises a dynamic range and a color gamut of a target HDR video constituted by the target HDR picture, a dynamic range and a color gamut of a reconstructed video constituted by the reconstructed picture, a determined mapping parameter from the dynamic range of the reconstructed video to the dynamic range of the target HDR video, and/or a conversion parameter from the color gamut of the reconstructed video to the color gamut of the target HDR video; and determining the reshaping parameter used for reshaping the reconstructed picture according to the picture-layer reshaping parameter and the sequence-layer reshaping parameter, wherein the target HDR picture is an HDR picture that is in an original HDR video inputted into an encoder and corresponds to the reconstructed picture;

wherein the determining a reshaping parameter used for reshaping the reconstructed picture according to the picture-layer reshaping parameter and the sequence-layer reshaping parameter comprises: determining that one of the picture-layer reshaping parameter, the sequence-layer reshaping parameter, and a reshaping parameter used for reshaping a preceding encoded picture in an encoding order is the reshaping parameter used for reshaping reconstructed picture, wherein the determining that one of the picture-layer reshaping parameter, the sequence-layer reshaping parameter, and a reshaping parameter used for reshaping a preceding encoded picture according to an encoding order is the reshaping parameter used for reshaping the reconstructed picture comprises:

reshaping the reconstructed picture by using the picture-layer reshaping parameter, reshaping the reconstructed picture by using the sequence-layer reshaping parameter, and reshaping the reconstructed picture by using the reshaping parameter used for reshaping the preceding encoded picture; and determining that one of the picture-layer reshaping parameter, the sequence-layer reshaping parameter and the reshaping parameter used for reshaping the preceding encoded picture which minimizes the error between the HDR picture obtained by reshaping the reconstructed picture and the target HDR picture is the reshaping parameter used for reshaping the reconstructed picture.

10. The method according to claim 9, wherein the writing the determined reshaping parameter used for reshaping the reconstructed picture into the video bitstream in which the bits of the current coding picture are included or into the picture-layer data unit and/or the slice-layer data unit of the to-be-processed video bitstream comprises:

when the reshaping parameter used for reshaping the reconstructed picture is the sequence-layer reshaping parameter, encoding the sequence-layer reshaping parameter, and writing encoded bits into the PPS and/or the parameter set referred to by the PPS of the video bitstream in which the bits of the current coding picture are included or the to-be-processed video bitstream;

when the reshaping parameter used for reshaping the reconstructed picture is the picture-layer reshaping parameter or the reshaping-parameter used for reshaping the preceding encoded picture, encoding the picture-layer reshaping parameter or the reshaping parameter used for reshaping the preceding encoded picture, and writing encoded bits into the parameter data unit included in the AU of the video bitstream in which the bits of the current coding picture are included or the to-be-processed video bitstream;

or when the reshaping parameter used for reshaping the reconstructed picture is the picture-layer reshaping parameter, encoding the picture-layer reshaping parameter, and writing encoded bits into the parameter data unit included in the AU of the video bitstream in which the bits of the current coding picture are included or the to-be-processed video bitstream; when the reshaping parameter used for reshaping the reconstructed picture is the reshaping parameter used for reshaping the preceding encoded picture, encoding fourth identification information in the AU of the video bitstream in which the bits of the current coding picture are included or the to-be-processed video bitstream, wherein the fourth identification information is used for indicating that the reshaping parameter is the reshaping parameter used for reshaping the preceding encoded picture;

wherein the parameter data unit is a data unit included in the AU independently of a slice bitstream data unit, wherein the method further comprises: encoding identification information for indicating the reshaping parameter in at least one of the following manners: a manner of encoding first identification information used for indicating the reshaping parameter in a video parameter set (VPS), and a manner of encoding second identification information used for indicating the reshaping parameter in a sequence parameter set (SPS).

11. The method according to claim 9, wherein the determining a reshaping parameter used for reshaping the reconstructed picture according to the picture-layer reshaping parameter and the sequence-layer reshaping parameter comprises: determining the reshaping parameter used for reshaping the reconstructed picture from the picture-layer reshaping parameter, the sequence-layer reshaping parameter as well as one or more first other reshaping parameters encoded in a used picture-layer parameter set and/or a used slice-layer parameter set other than the PPS in the slice header comprised in the AU corresponding to the reconstructed picture, wherein the determining the reshaping parameter used for reshaping the reconstructed picture from the picture-layer reshaping parameter, the sequence-layer reshaping parameter, and the first other reshaping parameter comprises:

reshaping the reconstructed picture by using the picture-layer reshaping parameter, reshaping the reconstructed picture by using the sequence-layer reshaping parameter, and reshaping the reconstructed picture by using the first other reshaping parameter; and determining that one of the picture-layer reshaping parameter, the sequence-layer reshaping parameter, and the first other reshaping parameter which minimizes the error between the HDR picture obtained by reshaping the reconstructed picture and the target HDR picture is the reshaping parameter used for reshaping the reconstructed picture.

12. The method according to claim 11, wherein the writing the determined reshaping parameter used for reshaping the reconstructed picture into the picture-layer data unit and/or the slice-layer data unit of the video bitstream in which the bits of the current coding picture are included or the to-be-processed video bitstream comprises:

when the reshaping parameter used for reshaping the reconstructed picture is the sequence-layer reshaping parameter, in the slice header, encoding information of identifying that the picture-layer parameter set and/or the slice-layer parameter set other than the PPS is not used;

when the reshaping picture used for reshaping the reconstructed picture is the first other reshaping parameter, in the slice header, encoding information of identifying that the picture-layer parameter set and/or the slice-layer parameter set other for the PPS is used, and encoding a parameter set identifier of the parameter set in which the first other reshaping parameter is located;

when the reshaping parameter used for reshaping the reconstructed picture is the picture-layer reshaping parameter, encoding the picture-layer reshaping parameter and writing encoded bits into a newly created parameter set data unit, wherein the newly created parameter set data unit is configured with a parameter set identifier, and in the slice header, encoding information of identifying that picture-layer parameter set and/or the slice layer parameter set other for the PPS is used, and encoding the parameter set identifier.

13. The method according to claim 9, wherein the determining a reshaping parameter used for reshaping the reconstructed picture according to the picture-layer reshaping parameter and the sequence-layer reshaping parameter comprises: determining the reshaping parameter used for reshaping the reconstructed picture from the picture-layer reshaping parameter, the sequence-layer reshaping parameter and one or more second other reshaping parameters encoded in a system layer of a transport stream or a media file, wherein the determining the reshaping parameter used for reshaping the reconstructed picture from the picture-layer reshaping parameter, the sequence-layer reshaping parameter and the one or more second other reshaping parameter comprises:

reshaping the reconstructed picture by using the picture-layer reshaping parameter, reshaping the reconstructed picture by using the sequence-layer reshaping parameter, and reshaping the reconstructed picture by using the second other reshaping parameter; and determining that one of the picture-layer reshaping parameter, the sequence-layer reshaping parameter, and the second other reshaping parameter which minimizes the error between the HDR picture obtained by reshaping process the reconstructed picture and the target HDR picture is the reshaping parameter used for reshaping the reconstructed picture.

14. The method according to claim 13, wherein the writing the determined reshaping parameter used for reshaping the reconstructed picture into the picture-layer data unit and/or the slice-layer data unit of the video bitstream in which the bits of the current coding picture are included or into the picture-layer data unit and/or the slice-layer data unit of the to-be-processed video bitstream comprises:

when the reshaping parameter used for reshaping the reconstructed picture is the sequence-layer reshaping parameter, encoding fifth identification information in the system layer, wherein the fifth identification information is used for indicating that the reshaping parameter used for reshaping the reconstructed picture does not use the reshaping parameter which has been encoded in the system layer;

when the reshaping parameter used for reshaping the reconstructed picture is the picture-layer reshaping parameter, encoding the picture-layer reshaping parameter in the system layer;

when the reshaping parameter used for reshaping the reconstructed picture is the second other reshaping parameter, encoding the second other reshaping parameter in the system layer, or encoding sixth identification information in the system layer, wherein the sixth identification information is used for indicating that the reshaping parameter used for reshaping the reconstructed picture uses the reshaping parameter which has been encoded in the system layer, wherein a reshaping parameter used for performing a secondary reshaping on the reconstructed picture and control information used for indicating an execution mode of the secondary reshaping are encoded in the system layer.

15. A picture decoding device, comprising:

at least one processor; and a memory communicably connected with the at least one processor and configured for storing computer-executable instructions executable by the at least one processor;

wherein the computer-executable instructions when executed by the at least one processor causes the at least one processor to perform the picture decoding method of claim 1.

16. A picture encoding device, comprising:

a memory communicably connected with the at least one processor and configured for storing computer-executable instructions executable by the at least one processor;

wherein the computer-executable instructions when executed by the at least one processor causes the at least one processor to perform the picture encoding method of claim 9.

* * * * *